US006586666B2

(12) United States Patent
Abe

(10) Patent No.: US 6,586,666 B2
(45) Date of Patent: Jul. 1, 2003

(54) ELECTRONIC MUSICAL INSTRUMENT

(75) Inventor: Seiji Abe, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/996,659

(22) Filed: Nov. 28, 2001

(65) Prior Publication Data

US 2002/0062726 A1 May 30, 2002

(30) Foreign Application Priority Data

Nov. 29, 2000 (JP) ....................................... 2000-362845
Aug. 31, 2001 (JP) ....................................... 2001-263453

(51) Int. Cl.⁷ ................................................ G09B 15/08
(52) U.S. Cl. ..................... 84/477 R; 84/478; 84/411 R; 84/464 A; 84/600
(58) Field of Search .......................... 84/600, 744, 104, 84/111, 174, 290–291, 411 R, 416–417, 411 P, 423 R, 453, 464 R, 464 A, 477 R, 478

(56) References Cited

U.S. PATENT DOCUMENTS 4,442,750 A * 4/1984 Bowley ................. 250/227.19
5,641,925 A * 6/1997 Koseki ........................ 84/433
6,037,534 A * 3/2000 Yasutoshi et al. ......... 84/423 R
6,342,665 B1 * 1/2002 Okita et al. .................... 84/600

FOREIGN PATENT DOCUMENTS

| | | |
|---|---|---|
| JP | 11-030983 | 2/1999 |
| JP | 11-251638 | 9/1999 |

* cited by examiner

*Primary Examiner*—Marlon T. Fletcher
(74) *Attorney, Agent, or Firm*—Morrison & Foerster LLP

(57) ABSTRACT

There is provided an electronic musical instrument which enables the whole periphery of at least one pad member to shine by a simple construction, and at the same time maintain durability and low costs, and a shining method therefor. An electronic musical instrument of a drum type detects beats on a surface to be beaten of the pad member, and generates a musical tone signal in response to an output indicative of the detected beats. A light transmitter in a linear form is arranged along the periphery of the pad member and guides light which has been emitted from a light source arranged in the vicinity of one end of the light transmitter and entering the light transmitter via the one end, by utilizing principles of light propagation of an optical fiber, toward the other end of the light transmitter, and at the same time causes at least part of the light entering via the one end to emit out of the light transmitter via a light emitting surface formed by roughening part of an exposed surface of the light transmitter.

12 Claims, 17 Drawing Sheets

ELECTRONIC MUSICAL INSTRUMENT

BACKGROUND OF THE INVENTION

1. Field of the Invention

The present invention relates to an electronic musical instrument of a drum type or a keyboard type that detects beats on pad members or depressions of keys to generate a signal indicative of the detected beats or depressions, for musical tones generation based on the signal.

2. Prior Art

Conventionally, electronic musical instruments have been proposed in which portions of the instruments are caused to shine by light from light sources, such as LED's. For example, Japanese Laid-Open Patent Publication (Kokai) No. 11-30983 discloses an electronic drum including light transmitters (light transmitting devices) arranged at pad frames forming the peripheries of respective pads, and light sources, such as LED's, arranged substantially in contact with the respective light transmitters, to thereby cause the pad frames to shine.

Further, a type of electronic keyboard is known which includes keys formed of a light-transmissive material, and electronic sources arranged below the keys to illuminate corresponding ones of the keys from below, or arranged in the vicinity of root portions of the keys to illuminate top surfaces of the corresponding keys from rear, to thereby cause the keys to shine.

In these electronic musical instruments, the light sources are selectively caused to emit light according to the performance of a musical piece, or in response to light emission-instructing signals indicating pads to be beaten or keys to be depressed for performance practice.

In the conventional electronic drum, however, to cause the whole pad frame to shine, a plurality of light sources have to be provided, which complicates the construction of the drum and results in an increased manufacturing cost. Further, due to provision of a large number of light sources at locations close to the pads to be beaten, the drum is prone to failure and is degraded in durability.

On the other hand, in the conventional electronic keyboard, even if the manner of illumination of each key is varied by changing the location, orientation, color, or the like of a light source arranged for the key, the key shines in a generally uniform manner, and it is difficult to freely configure or design a manner of lighting of the key for visual recognition. Therefore, there is room for improvement in the freedom of configuration of the manner of lighting e.g. for providing more ornamental lighting.

Further, a technique is also known in which a key is caused to shine such that light appears to be emitted from the key itself. In this technique, however, a considerable intensity of light is required even for causing one key to shine, and to cause shining of ten or more keys (e.g. a total of ten or more keys as a sum total of keys to shine according to instructions for depression by automatic accompaniment performance and keys to shine by erroneous depressions thereof which do not conform to the instructions for depression), the electric power required for this purpose and also for a main circuit of the electronic musical instrument can cause an electrically overloaded status of the instrument. This brings about a drop in the power supply voltage, causing interruption of musical tones and other malfunctions. If the electronic musical instrument is of a battery-powered type, a drastic power consumption of the battery can be caused in addition to the above inconveniences.

Moreover, in the above-described conventional electronic drum, the provision of light transmitters needs fixing the light transmitters to a case, and this can be done e.g. by providing a protruding portion on one of each light transmitter and the casing, and a recessed portion in the other of the two, and fitting the protruding portion in the recessed portion. However, due to an inevitable manufacturing error and a tolerance for assemblage, a considerable gap can be formed between the fitted portions of the two. Further, each light transmitter is an optically light transmissive member, and therefore, the light transmitter is different in material from the casing, so that the above gap varies with the temperature. Therefore, when the instrument is in use, so-called "rattling" may be produced which is a mechanical noise occurring due to the presence of the gap when a pad member is beaten.

SUMMARY OF THE INVENTION

It is a first object of the present invention to provide an electronic musical instrument which can cause the whole peripheral area of each pad member to shine by a simple construction, and at the same time maintain durability and low costs, as well as a shining method for the electronic musical instrument.

It is a second object of the present invention to provide an electronic musical instrument which can cause individual keys to shine in desired fashions, by a simple construction, and in particular, to provide an electronic musical instrument realized as an electronic keyboard which is capable of causing part of each key to shine with a low power, and preventing the part from being in shadow of fingers during performance, with efficiency.

It is a third object of the present invention to provide an electronic musical instrument which is capable of causing the whole peripheral area of each pad member to shine while preventing rattling from being caused by a beat on the pad member.

It is a fourth object of the present invention to provide a shining method for an electronic musical instrument, which is capable of causing an operating member to shine in desired fashions by a simple construction.

To attain the first object, according to a first aspect of the present invention, there is provided an electronic musical instrument of a drum type, comprising at least one pad member that has at least one surface to be beaten, at least one detecting device that detects beats on the surface to be beaten of the at least one pad member, a musical tone signal-generating section that generates a musical tone signal in response to an output from the at least one detecting device, a light transmitter in a linear form arranged along a periphery of the pad member, the light transmitter having one end, another end, and an exposed surface, part of the exposed surface being roughened to provide a light-emitting surface, and a light source arranged in the vicinity of the one end of the light transmitter, for emitting light toward the one end, wherein the light transmitter guides the light emitted from the light source and entering the light transmitter via the one end, by utilizing principles of light propagation of an optical fiber, toward the other end, and at the same time causes at least part of the light entering via the one end to emit out of the light transmitter.

With the above construction, when the light source emits light, the light enters one end of the light transmitter. The light entering the light transmitter is guided toward to the other end of the light transmitter due to principles of light propagation of an optical fiber. Part of the exposed surface of the light transmitter is in a roughened form to provide a light-emitting surface, and part of the light entering via the one end is irregularly reflected or diffused at the light-emitting surface to emit light therefrom so as to be visually recognized. As a result, the whole peripheral area of the pad member can be caused to shine by a simple construction. Further, the light-emitting function of this electronic musical instrument can be realized by a small number of LED's or the like, and therefore, it provides the advantageous features of low manufacturing costs, excellent durability, and less proneness to failure. Thus, according to the first aspect of the invention, it is possible to cause the whole peripheral area of the pad member to shine by a simple construction, while maintaining durability and low manufacturing costs.

Preferably, the light transmitter has a substantially annular shape having an outer periphery, part of which has a cutout formed therein to provide the one end and the other end, the light source being arranged in the cutout in a manner being interposed between the one end and the another end.

According to this preferred embodiment, the light transmitter has a substantially annular shape having an outer periphery, part of which has a cutout formed therein. Therefore, the light entering the light transmitter via the one end thereof is guided along the peripheral area of the pad member to the other end, whereby the peripheral area of the pad member is caused to shine approximately in an annular form. Thus, the peripheral area of the pad member can be caused to shine approximately in an annular form by a minimum number of light source, and the instrument can be simplified in construction.

Preferably, the light transmitter has at least part of a surface opposite to the light-emitting surface thereof formed with wavy serrations such that the surface opposite to the light-emitting surface is wavy in cross section along a length of the light transmitter.

According to this preferred embodiment, part of the light is reflected from the surface formed with wavy serrations and is directed toward the light-emitting surface, so that the amount of light emitted out of the light transmitter from the light-emitting surface is increased. This increases intensity of emitted light, resulting in an increased ease of visual recognition of the light.

To attain the second object, according to a second aspect of the invention, there is provided an electronic musical instrument of a keyboard type comprising at least one key formed of a light transmissive member, the at least one key having a distal end and a proximal end, part of the key being roughened to provide a diffusing surface, at least one detecting device arranged for the at least one key, for detecting a key depressing operation applied to the at least one key, a musical tone signal-generating section that generates a musical tone signal in response to an output from the at least one detecting device, and a light source arranged in the vicinity of the proximal end of the key, for emitting light toward the root portion, the key being configured such that light emitted from the light source and entering the light transmitter via the proximal end is guided by utilizing principles of light propagation of an optical fiber, toward the distal end, and at least part of the light entering via the proximal end is diffused at the diffusing surface so as to be visually recognized from outside of the light transmitter.

According to this electronic musical instrument, when a light source emits light, the light enters a key associated therewith and formed of a light transmissive member via the proximal end thereof. The light entered is guided by principles of light propagation of an optical fiber toward the distal end of the key. Part of the key is in a roughened form to provide a diffusing surface, and at least part of the light entering the key via the proximal end is diffused at the diffusing surface so as to be visually recognized from the outside. This makes it possible to cause a desired portion of a key to shine by a simple construction. Moreover, the location of a light-emitting portion (lighted portion) and the manner of visual recognition can be feely set by changing the location and manner of provision of the diffusing surface, which enhances the degree of freedom of the design, and makes it easy to cause ornamental light emission. Further, owing to the enhanced efficiency of light emission, economy of power consumption can be attained. Thus, each key of the instrument can be caused to shine in a desired manner by a simple construction.

Preferably, the key has a top surface, and the light entering the at least one key is visually recognized due to at least one of phenomena of the light directly leaking via the diffusing surface after being diffused at the diffusing surface, and the light leaking via the top surface of the key after being diffused at the diffusing surface and transmitting through an interior of the key.

According to this preferred embodiment, if surfaces viewable from outside, such as side surfaces of a key, are formed as diffusing surfaces, the light entering the key directly leaks from the side surfaces, and at the same time leaks via the top surface of the key after transmitting through the interior of the transparent key. Further, if part of the bottom surface of the key (e.g. bottom surfaces of portions along the sides in the direction of length of the key) or a bottom surface of a lower end of the key are formed as the diffusing surfaces, the light entered transmits through the interior of the key and leaks out via the top surface of the key, causing the top surface to shine. In this case, a display for instructing depression of a key is prevented from being hidden by fingers of the player. Thus, the manner of visual recognition of the light can be varied depending on the location at which the diffusing surface is provided, whereby the optimum manner of the light emission can be set in a manner adapted to the type of the electronic musical instrument.

Preferably, the diffusing surface has a bottom surface facing downward, at least part of which is formed with wavy serrations such that the bottom surface is wavy in cross section along a length of the key.

According to this preferred embodiment, part of the light is reflected from the surface formed with wavy serrations and is directed upward, thereby increasing the amount of light emitted outward from the top of the key depression surface of the keys. This makes it possible to increase the amount of emitted light, thereby making it easier to visually recognize the light.

To attain the third object, according to a third aspect of the invention, there is provided an electronic musical instrument of a drum type comprising at least one pad member that has at least one surface to be beaten, at least one detecting device that detects beats on the at least one surface to be beaten of the at least one pad member, a musical tone signal-generating section that generates a musical tone signal in response to an output from the at least one detecting device, a case, a light transmitter arranged along a periphery of the pad member, a light source that emits light toward the light transmitter, a light transmitter holder for holding the light transmitter fixedly with respect to the case, and a tape material, the light transmitter being press-fitted in the light transmitter holder via the tape material and held therein.

According to this electronic musical instrument, the light transmitter is press-fitted in the light transmitter holder via the tape material to be held therein, whereby the light transmitter is fixedly held with respect to the case. The tape material fills the gap between the light transmitter and the light transmitter holder, so that the vibrations caused by beats on the pad member are absorbed by the tape material, whereby mechanical noise such as "rattling" can be prevented. Thus, it is possible to cause the whole peripheral area of the pad member to shine while preventing the rattling from being caused by beats on the pad member.

To attain the first object, according to a fourth aspect of the invention, there is provided an electronic musical instrument of a drum type comprising at least one pad member that has at least one surface to be beaten, at least one detecting device that detects beats on the at least one surface to be beaten of the at least one pad member, a musical tone signal-generating section that generates a musical tone signal in response to an output from the at least one detecting device, a case, a light transmitter arranged substantially along a whole periphery of the pad member, the light transmitter having a surface, a light source that is configured to be sufficiently smaller than the light transmitter, and emits light toward the light transmitter, and a holder that holds the pad member and the light transmitter fixedly with respect to the case, wherein at least part of the light emitted from the light source and transmitted through the light transmitter is visually recognized by being emitted out from the surface of the light transmitter.

According to this electronic musical instrument, the light emitted from the light source is visually recognized by being transmitted through the light transmitter, and emitted out from the surface of the light transmitter. Since the light transmitter is arranged substantially along a whole periphery of the pad member, it is possible to cause the whole periphery of the pad member to shine. Further, since the light source is configured to be sufficiently smaller than the light transmitter, the size of the instrument can be reduced, and what is more, the light source can be easily implemented by a small number of LED's, which ensures low manufacturing costs, durability, and reduced liability to failure. In short, it is possible to cause the whole periphery of the pad member to shine by a simple construction, while maintaining durability and low manufacturing costs.

To attain the first object, according to a fifth aspect of the invention, there is provided an electronic musical instrument of a drum type comprising at least one pad member that has at least one surface to be beaten, at least one detecting device that detects beats on the at least one surface to be beaten of the at least one pad member, a musical tone signal-generating section that generates a musical tone signal in response to an output from the at least one detecting device, a case, a light transmitter arranged along a periphery of the pad member, a light source that emits light toward the light transmitter, and a holder that holds the pad member and the light transmitter fixedly with respect to the case, wherein the light source is arranged at a location substantially below the pad member.

According to this electronic musical instrument, the light source emits light toward the light transmitter, and leakage of at least part of the light out of the light transmitter causes the periphery of the pad member to be visually recognized as shining. The light source is arranged at a location substantially below the pad member, which reduces the possibility of the light source being beaten by accident when the pad member is beaten, thereby making the electronic musical instrument less liable to failure. Further, if the light source is implemented by a small number of LED's, this ensures low manufacturing costs and excellent durability. Therefore, it is possible to cause the whole periphery of the pad member by a simple construction, while maintaining durability and low manufacturing costs.

To attain the fourth object, according to a sixth aspect of the invention, there is provided a shining method for an electronic musical instrument of a drum type, including at least one operating member at least part of which is formed by a light transmitter, the at least one operating member having one end, another end, a surface to be beaten, and a diffusing surface that is roughened, the electronic musical instrument detecting a beat on the surface to be beaten, and generating a musical tone signal in response to an output indicative of the detection, the method comprising the steps of causing light from a light source to enter the at least one operating member via the one end, and guiding the light entering the operating member via the one end toward the other end by utilizing principles of light propagation of an optical fiber, and causing at least part of the light entering the operating member via the one end to be diffused at the diffusing surface so as to be visually recognized from outside, wherein the light source is arranged in the vicinity of the one end of the operating member.

According to this shining method, light emitted from a light source enters the operating member via one end of thereof, and the light entering the operating member is guided toward the other end by utilizing principles of light propagation of an optical fiber, and at least part of the light entering the operating member via the one end is diffused at the diffusing surface so as to be visually recognized from outside. Therefore, it is possible to cause the operating member to shine in desired fashions.

To attain the first object, according to a seventh aspect of the invention, there is provided a shining method for an electronic musical instrument of a drum type including a pad member, the pad member having a surface to be beaten, the electronic musical instrument detecting a beat on the surface to be beaten of the pad member, and generating a musical tone signal in response to an output indicative of the detection, the method comprising the steps of causing light to be emitted from a light source toward a light transmitter arranged substantially along a whole periphery of the pad member, causing the light emitted from the light transmitter to enter the light transmitter, and causing at least part of the light entering the light transmitter to be emitted out from the surface of the light transmitter so as to be visually recognized from outside, wherein the light source is configured to be sufficiently smaller than the light transmitter.

According to this method, the light emitted from the light source enters the light transmitter, and at least part of the light emitted from the light source is visually recognized by being transmitted through the light transmitter and emitted out from the surface of the light transmitter. The light transmitter is arranged substantially along the whole periphery the pad member, and the light source is configured to be sufficiently smaller than the light transmitter. This makes it possible to cause the whole periphery of the pad member to shine by a simple construction, while maintaining durability and low manufacturing costs.

The above and other objects, features and advantages of the present invention will become more apparent from the following detailed description taken in conjunction with the accompanying drawings.

BRIEF DESCRIPTION OF THE DRAWINGS

FIGS. 17A to 17D are views showing other examples of the construction of a light source, in which:

FIG. 17A is a perspective view showing the light source;

FIG. 17B is a view schematically showing the construction of a bipolar light-emitting diode (BLD);

FIG. 17C is a view schematically showing the appearance of the bipolar light-emitting diode (BLD); and FIG. 17D is a plan view showing the construction of an LED cover;

DETAILED DESCRIPTION OF PREFERRED EMBODIMENTS

The present invention will now be described in detail with reference to the drawings showing preferred embodiments thereof.

First Embodiment

Figure 1:
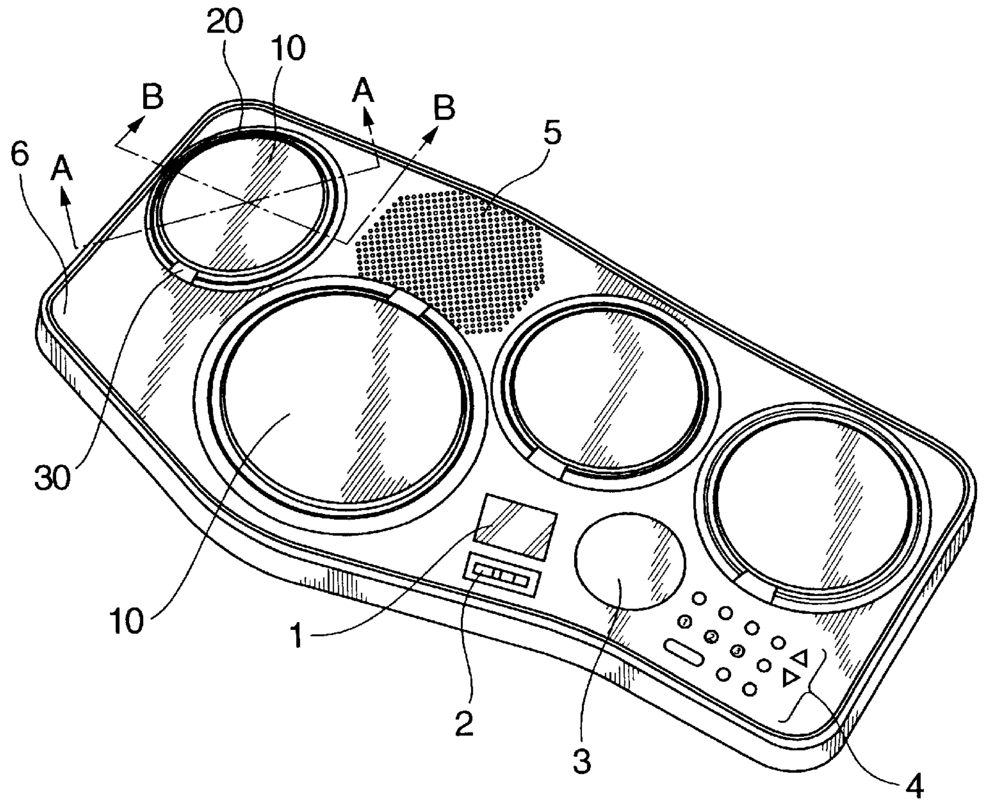
FIG. 1 is a view showing the appearance of an electronic musical instrument of a drum type according to a first embodiment of the present invention.

FIG. 1 shows the appearance of an electronic musical instrument of a drum type according to a first embodiment of the present invention.

The electronic musical instrument according to the present embodiment includes a plurality of (four in the illustrated example) pad members 10 arranged on an upper case 6. Each pad member 10 has an annular light-emitting unit 20 arranged on the periphery thereof. The light-emitting unit 20 includes a light source 30. As will be described in detail hereinafter, in the present embodiment, by beating any of the pad members 10, for instance, a musical tone having a tone color (snare drum, bass drum, cymbal or the like) assigned thereto is electronically generated, and at the same time, part of the light-emitting unit 20 exclusive of the light source 30 is caused to shine. The plurality of assemblies of the pad members 10 and the respective light-emitting units 20 associated therewith can be different in size but are basically of the same configuration.

The electronic musical instrument according to the present embodiment also includes a display section 1 implemented by a liquid crystal display, a 7-segment LED or the like, for displaying various kinds of information, a power switch 2 of a slide type for switching on and off the power, a rotary encoder 3 for setting parameters, a functional switch section 4 for setting various parameters, such as the volume of a musical tone and a tempo, and a speaker 5 for generating musical tones of a drum and the like.

Figure 2:
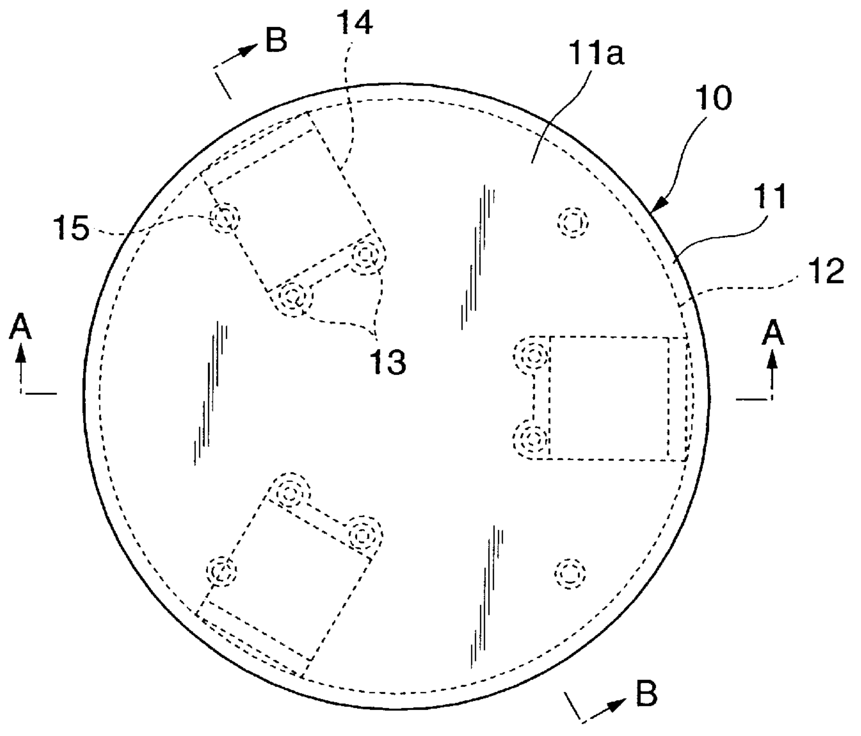
FIG. 2 is a plan view showing a pad member appearing in FIG. 1.
Figure 3:
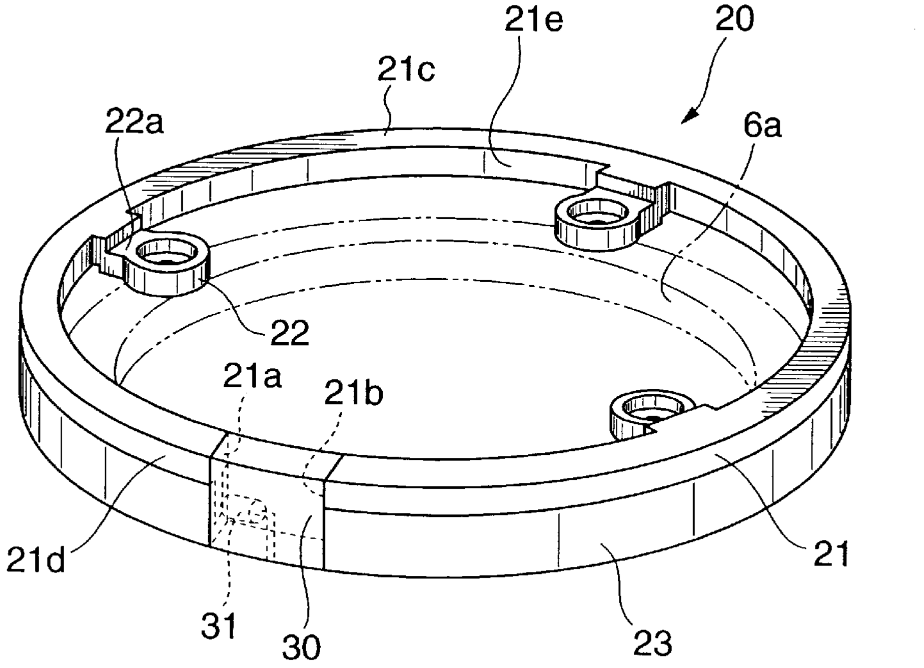
FIG. 3 is a perspective view showing the appearance of a light-emitting unit appearing in FIG. 1.
Figure 4:
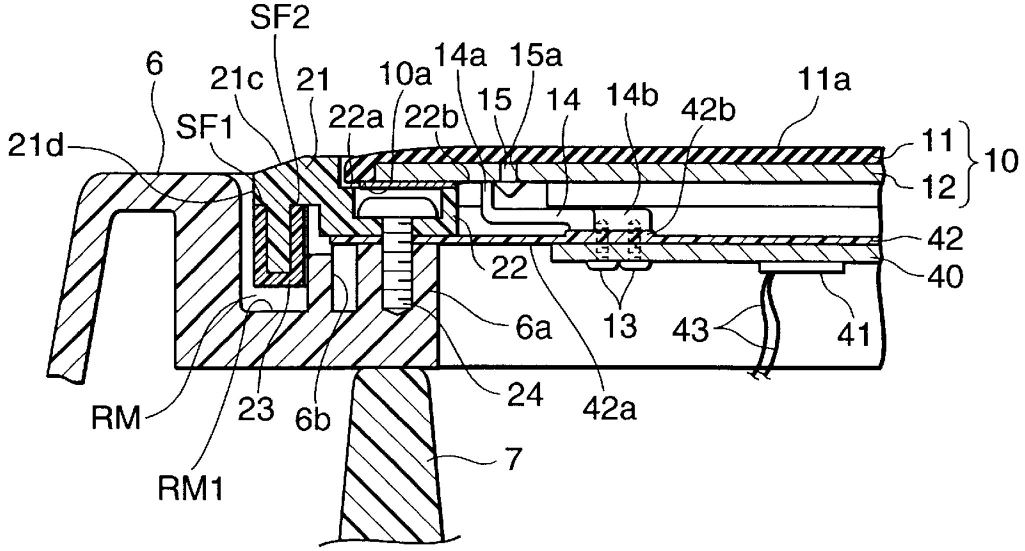
FIG. 4 is a fragmentary cross-sectional view taken on line A—A of FIG. 1.
Figure 5:
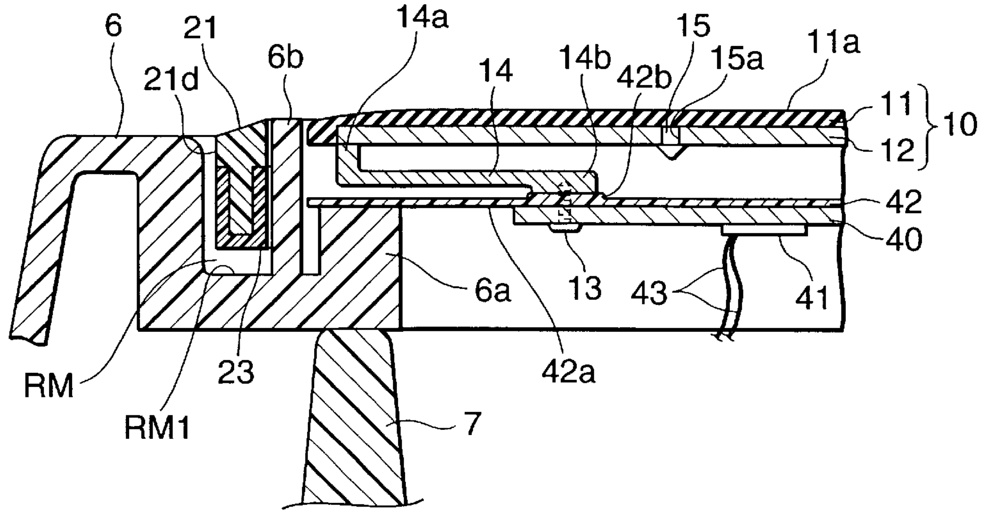
FIG. 5 is a fragmentary cross-sectional view taken on line B—B of FIG. 1.

FIG. 2 is a plan view showing the pad member 10 employed in the present embodiment, FIG. 3 a perspective view showing the appearance of a light-emitting unit 20 as viewed obliquely from above, FIG. 4 a fragmentary cross-sectional view taken on line A—A of FIG. 1, and FIG. 5 a fragmentary cross-sectional view taken on line B—B of FIG. 1. It should be noted that lines A—A and B—B correspond to those appearing in FIG. 1.

Referring to FIGS. 4 and 5, the pad member 10 is formed by a pad skin member 11 and a pad plate 12. The pad plate 12 is made of a metal, such as iron and aluminum, a hard resin, or the like, and has a disk shape. The pad skin member 11 is formed of a resilient member, such as rubber, and the top surface of the pad skin member 11 provides a beating surface 11*a* (surface to be beaten), which is beaten by the player during performance. Protrusions 15 each having a hook-shaped end extend from respective four portions of an underside surface of the pad skin member 11, and are fitted through holes 15*a* formed in corresponding portions of the pad plate 12, whereby the pad skin member 11 is secured to the pad plate 12. Further, the pad skin member 11 may be secured to the pad plate 12 by an adhesive or the like.

Arranged below the pad member 10 are a resilient membrane member 42 and a sensor support member 40 (see FIGS. 4 and 5). The resilient membrane member 42 is formed of a synthetic resin (e.g. polypropylene) which is resilient and is hard to transmit vibrations. The resilient membrane member 42 has a disk shape, and includes a thick membrane portion 42*b* formed at a radially intermediate location between the center and the periphery of the resilient membrane member 42, with the remaining portion forming a thin membrane portion 42*a*. The thickness of the thin membrane portion 42*a* is approximately 0.3 mm, for instance. The action of the thin membrane portion 42*a* will be described later.

The sensor support member 40 is bonded to an underside surface of the resilient membrane member 42. The sensor support member 40 is made of a rigid plate member by forming the same into a disk shape, and arranged such that the peripheral edge thereof is located slightly radially outward of the thick membrane portion 42*b*.

It should be noted that the thick membrane portion 42*b* of the resilient membrane member 42 may be formed as a thin portion having the same thickness as that of the thin membrane portion 42*a*. This is because it is free from problems concerning the strength and maintenance thereof since the resilient membrane member 42 is partly sandwiched between the sensor support member 40 and respective lower ends 14*b* of bridge members 14, referred to hereinafter, and fixed to these members by screws 13.

The sensor support member 40 is connected to the pad member 10 together with the resilient membrane member 42 by means of the bridge members 14 (see FIGS. 4 and 5). The bridge members 14 are each made of a resilient material by forming the same into a band shape wide in a circumferential direction thereof, and arranged at respective three locations at circumferentially equidistant intervals (see FIG. 2).

Each bridge member 14 has its upper end 14*a* connected to the pad member 10. When the pad plate 12 is made of a metal, the bridge members 14 may be formed by bending a cut-out portion of the body of the pad plate 12, whereas when the pad plate 12 is made of a resin, the bridge members 14 may be formed integrally with the body of the pad plate 12 by using a mold of a slide core type.

The bridge members 14 each have the thick membrane portion 42*b* of the resilient membrane member 42 attached thereto such that the thick membrane portion 42*b* is sandwiched between a lower or radially inner end 14*b* of the bridge member 14 and the sensor support member 40. The lower end 14*b* of each bridge member 14 is secured to the sensor support member 40 and the resilient membrane member 42 by two screws 13. The bridge members 14 transmit vibrations caused by beats on the pad member 14 to the sensor support member 40. The bridge members 14 extend radially inward from portions of the underside of the pad member 10 in the vicinity of the outer peripheral edge of the same, and are formed to have a band shape wide in the direction of the circumference of the pad member 10, as mentioned above, so that vibrations of the pad member 10 caused by beats on the pad member 10 are transmitted through wide paths extending along the peripheral area of the pad member 10 and radially inward via the bridge members 14. This effectively prevents "non-uniform sensitivity", i.e. a phenomenon that the output from the electronic musical instrument varies with the location of a point of a beat on the pad member 10.

In a substantially central portion of the sensor support member 40, a sensor section 41 is arranged. The sensor section 41 is implemented by a piezoelectric sensor or the like, for detecting vibrations which are caused by beats on the pad member 40 and transmitted through the bridge members 14 and the sensor support member 40.

As shown in FIG. 3, the light-emitting unit 20 is comprised of a light transmitter (light transmitting device) 21, a reflecting cover 23, and the light source 30. The light transmitter 21 and the reflecting cover 23 are generally in the form of an annulus with a portion of the annulus cut out to provide a space for accommodating the light source 30. The reflecting cover 23 is U-shaped in cross section with the opening of its recess being directed upward. The light transmitter 21 has a downwardly projected shape in cross-section with its protruding portion being directed downward. The protruding portion of the light transmitter 21 is fitted in the recess of the reflecting cover 23, and the light transmitter 21 and the reflecting cover 23 are bonded to each other at mating interfaces SF1, SF2 thereof (see FIG. 4).

It should be noted that the reflecting cover 23 may be elongated such that the bottom thereof reaches a bottom surface RM1 of an annular groove RM formed in the upper case 6 at a location corresponding to the light transmitter 21 and the reflecting cover 23. This makes it unnecessary to bond the light transmitter 21 and the reflecting cover 23 at the mating interfaces SF1, SF2, but the former can be press-fitted into the latter, whereby the assembly work, maintenance or inspection, and replacement become easy to carry out.

The light transmitter 21 is formed of a transparent resin, such as polycarbonate and acrylic, which allows light to transmit therethrough. As will be described hereinafter, the light transmitter 21 has one end providing a starting end face 21*a* where light enters, and the other end providing a terminating end face 21*b* where the light eventually reaches, with the light source 30 fitted in a gap between the starting end face 21*a* and the terminating end face 21*b*.

Figure 6A:
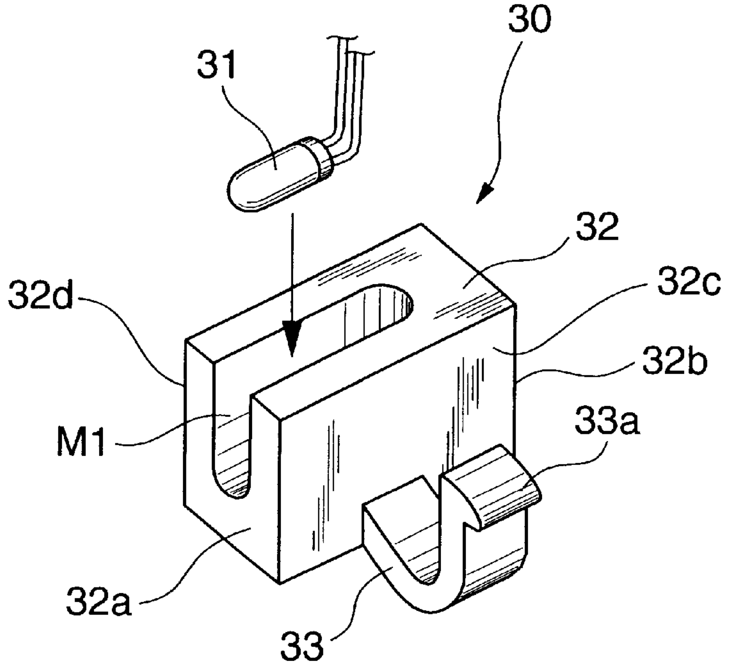
FIG. 6A is an exploded perspective view showing a light source in an upside down position, as viewed obliquely from above.
Figure 6B:
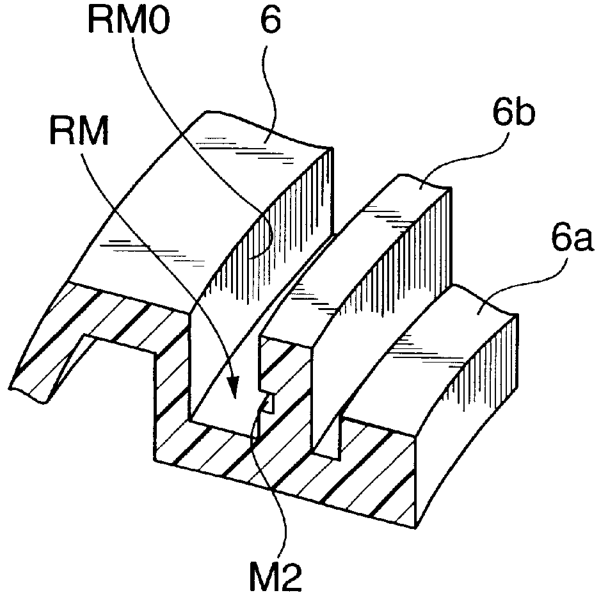
FIG. 6B is a fragmentary perspective view showing a sectioned portion of an upper case in which the light source is mounted, as viewed obliquely from above.

FIG. 6A is an exploded perspective view showing the light source 30 in an upside down position, as viewed obliquely from above. FIG. 6B is a fragmentary perspective view of a sectioned portion of the upper case 6 in which the light source 30 is mounted, as viewed obliquely from above.

The light source 30 is comprised of an LED 31 and an LED cover 32 (see FIG. 6A). The LED cover 32 has a groove M1 U-shaped in cross-section. The LED 31 as an light-emitting element is loosely fitted in the groove M1. The LED cover 32 has an inner side surface 32*c* (surface facing radially inward of the light-emitting unit 20) formed with a hook 33. The hook 33 is used to attach the light source 30 to the outer peripheral surface of an outer peripheral annular rib 6*b* protruding upward from the upper case 6. The hook 33 has a nail 33*a* formed at an end thereof.

The upper case 6 is formed of polystyrene or the like, and supported on a boss 7 of a lower case, not shown. The upper case 6 is formed with an inner peripheral annular rib 6*a* at a location radially inward of the outer peripheral annular rib 6*b* radially inward of the light-emitting element 20. The outer peripheral annular rib 6*b* forms the annular groove RM on the upper case side which extends along the whole periphery of the upper case 6 (see FIGS. 4, 5, and 6B). The outer peripheral annular rib 6*b* of the upper case 6 to which the light source 30 is attached has an outer side surface thereof formed with an engaging groove M2 (see FIG. 6B).

The light-emitting unit 20 is arranged in the case-side annular groove RM of the upper case 6. The light source 30 is turned upside down from the state shown in FIG. 6A, and while inserting the LED cover 32 in the case-side annular groove RM, the nail 33*a* of the hook 33 is engaged in the engaging groove M2 of the upper case 6, whereby an outer surface 32*d* of the LED cover 32 is urged against an outer wall RM0 (see FIG. 6B) of the groove RM by the resilient force of the hook 33 to cause the light source 30 to be fixed to the upper case 6. At this time, the light source 30 is arranged at a location below the pad member 10. This reduces the possibility of the light source 30 being beaten by accident when the pad member 10 is beaten, thereby making the electronic musical instrument less liable to failure. In the state of the light source 30 being thus mounted in the upper case 6, a starting end face-side surface 32*a* and a terminating end face-side surface 32*b* of the LED cover 32 are in contact with the starting end face 21*a* and the terminating end face 21*b* of the light transmitter 21. In this state, the LED 31 is opposed to the starting end face 21*a* of the light transmitter 21. Further, the LED cover 32 is formed of a synthetic resin or the like which is of a white colored type suitable for reflecting light. Therefore, when the LED 31 emits light, the light enters the light transmitter 21 with efficiency.

The reflecting cover 23 is also formed of a synthetic resin of a white colored type, similarly to the LED cover 32. Further, the light transmitter 21 has an outer peripheral surface 21*d* and an inner peripheral surface 21*e* subjected to surface treatment such that they have a very low surface roughness (like a mirror surface). Therefore, the light is readily reflected from the contact surfaces of the recess of the reflecting cover 23 and the protruding portion of the light transmitter 21 as well as the outer peripheral surface 21*d* and the inner peripheral surface 21*e*, and particularly, light transmitting through the light transmitter 21 to impinge on the surfaces which have the very low surface roughness (i.e. which are very smooth) at an angle equal to or smaller than a predetermined angle (at an angle of incidence equal to or larger than a predetermined angle) is almost totally reflected. This causes the light entered from the LED 31 to be efficiently transmitted or guided along the annular axis of the light transmitter 21 due to so-called principles of light propagation of an optical fiber.

The LED cover 32 is used not only for protection of the mirror-surfaced portion of the light transmitter 21, but also for further increased light transmission efficiency. That is, leakage of light which may be caused due to looser machining tolerances of mirror finish is minimized by the leaked light being reflected back into the light transmitter 21 by the white surfaces of the LED cover 32. Particularly, in the vicinity of the starting end face 21*a* of the light transmitter 21, the angle of the entered light with respect to wall surfaces (outer peripheral surface 21*d*, inner peripheral surface 21*e*) in the vicinity of the starting end face 21*a* of the light transmitter 21 is close to a right angle (the angle of incidence thereof is nearly zero degrees), so that leakage of light tends to occur even with the mirror surfaces if the light transmitter 21 alone is used. In the present embodiment, however, the white colored surfaces of the LED cover 32 make it possible to cause the leaked light to enter the light transmitter 21 again.

As described above, the terminating end face-side surface 32*b* of the LED cover 32 is in contact with the terminating end face 21*b* of the light transmitter 21, and what is more, the LED cover 32 is of a white colored type, the light reaching the terminating end face 21*b* after transmitting along the annular axis of the light transmitter 21 is almost totally reflected in an opposite direction to head toward the starting end face 21*a*. The total reflection at the terminating end face 21*a* and the action of the LED cover 32 make it possible to cause a light-emitting surface 21*c*, referred to hereinafter, to shine with fairly uniform brightness along the whole length of the light transmitter 21 from the starting end face 21*a* to the terminating end face 21*b*.

The light transmitter 21 has a top surface which slightly slopes downward as it extends radially outward for ease of visual recognition and is configured as the light-emitting surface 21*c* which has a slightly roughened surface (increased surface roughness) like ground glass. The slightly roughened surface of the light-emitting surface 21*c* causes the light from the inner portion of the light transmitter 21 to more readily undergo diffuse reflection, so that even light having a large angle of incidence with respect to the light-emitting surface 21*c* has part thereof leaked without the whole thereof being totally reflected, to say nothing of light having a small angle of incidence (at an angle close to a right angle) with respect to the light-emitting surface 21*c*. This leakage of the light decreases the brightness of an intermediate portion of the light transmitter 21 remote from the starting end face 21*a* and the terminating end face 21*b*, but causes the light-emitting surface 21*c* to appear to shine, when viewed from the player. The roughening of the light-emitting surface 21*c* may be carried out e.g. by the method of beads blasting.

The light transmitter 21 is provided with three stays 22 via which the light-emitting unit 20 is mounted on the upper case 6. The stays 22 are formed integrally with the inner peripheral surface 21*e* of the light transmitter 21, and arranged at equidistant intervals such that they are each located at an intermediate location between adjacent ones of the bridge members 14. The stays 22 are fixed to the annular rib 6*a* by screws 24 (FIG. 4) such that an underside surface of each stay 22 and a top surface of the annular rib 6*a* holds the thin membrane portion 42*a* of the resilient membrane member 42 therebetween. This rigidly fixes the light-emitting element 20 to the upper case 6.

Further, each stay 22 has a cushioning member 22*b* formed of sponge or urethane attached to a top surface 22*a* thereof (see FIG. 4). In an assembled state of the instrument, the cushioning member 22*b* is disposed in a slight gap which is formed between the top surface 22*a* of the stay 22 and an underside surface 10*a* of the pad member 10 when the pad member 10 is not beaten. The top surface of the cushioning member 22*b* may be slightly spaced from the underside surface 10*a* of the pad member 10*a*. When the pad member 10 is beaten, the stays 22 and the cushioning members 22*b* serve as a stopper to the pad member 10, whereby an excessive movement of the pad member 10 is prevented. The cushioning member 22*b* also serves to control an impulsive tone generated between the top surface 22*a* of the stay 22 and the pad member 10. It should be noted that the outer periphery of the pad member 10 is also slightly spaced apart from the light transmitter 21.

After all, when a beat is not imparted to the pad member 10 in a finally assembled state of the instrument, the pad member 10 is substantially apart from the light-emitting unit 20. Therefore, the pad member 10, the sensor section 41, the sensor support member 40, etc. are connected to the upper case 6 only via the thin membrane portion 42*a* of the resilient membrane member 42, and hence in a state floated with respect to the upper case 6. This causes the pad member 10, the sensor section 41, the sensor support member 40, etc. to act as if they were floating in the air independently of the upper case 6, so long as the transmission of vibrations is concerned. That is, the impact or vibrations from the upper case 6 (caused e.g. by a beat on the other pads, and a beat on the upper case 6 itself) are substantially absorbed and attenuated by the thin membrane portion 42*a*, whereby an unintended transmission of vibrations to the sensor section 41 can be effectively prevented. Thus, the intrusion of noise is inhibited by the above-described structure for transmitting vibrations to the sensor section 41.

On the other hand, the pad member 10 and the sensor support member 40 are connected by the bridge members 14, so that upon a beat being imparted to the pad member 10, the pad member 10 is freely vibrated. Vibrations caused by beats on the present pad member 10 are transmitted through the bridge members 14 and the sensor support member 40 to the sensor section 41, whereby the beats can be reliably detected. Further, when the pad member 10 is beaten, an excessive movement of the pad member 10 is prevented by the stays 22 and the cushioning member 22*b*, so that breakage and failure of the instrument are prevented, and at the same time, noise which is not desirable for the drum sound source is prevented from being generated. It should be noted that if it is so constructed that the upper case 6 and the pad member 10 can be always held in a non-contacting state, the cushioning member 22*b* can be dispensed with.

The electronic musical instrument according to the present embodiment is assembled in the following manner:

First, the sensor section 41 is bonded to the sensor support member 40. Next, the outer periphery of the thin membrane portion 42*a* is placed onto the annular rib 6*a* of the upper case 6. On the other hand, the light transmitter 21 is fitted into the reflecting cover 23. Then, the stays 22 are fixed to the annular rib 6*a* by the respective screws 24 with the thin membrane portion 42*a* sandwiched between the stays 22 and the annular rib 6*a*. Thereafter, the body of the instrument in an upside down position is placed onto the pad member 10 also in an upside down position, while properly positioning the sensor support member 40 on the resilient membrane member 42. In this state, the sensor support member 40 is fixed to the lower ends 14*b* of the bridge members 14 by the screws 13. Then, the body of the instrument is turned upside down so as to recover its normal position, and the light source 30 is mounted into the upper case 6. The light source 30 is then properly fitted between the starting end face 21*a* and the terminating end face 21*b* of the light transmitter 21.

Figure 7:
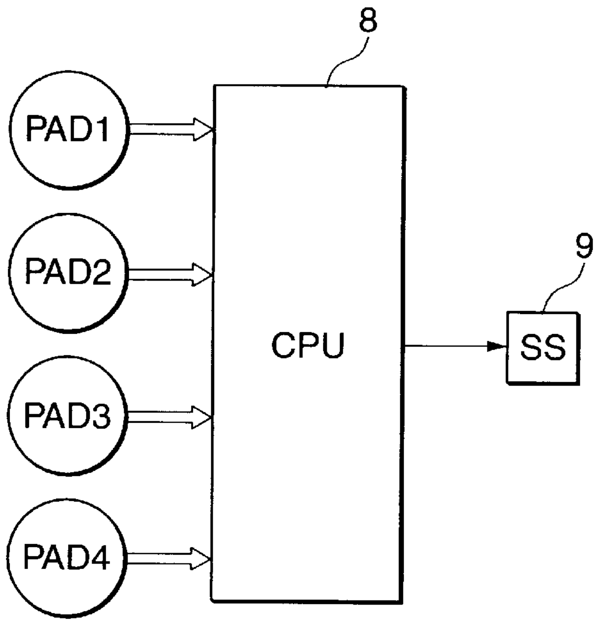
FIG. 7 is a block diagram showing the arrangement of essential components of a control system of the electronic musical instrument.

The emission of light from the light-emitting element 20 is controlled in the following manner:

FIG. 7 is a block diagram showing the construction of essential components of a control system of the electronic musical instrument according to the present embodiment. A signal indicative of a sensed beat generated by the sensor section 41 of each of the four pad members (PAD1, PAD2, PAD3, PAD4) 10 is inputted to a CPU 8, shaped, and delivered to a tone generator section 9 as a tone generator-instructing signal which triggers generation of a drum sound. Simultaneously, the light-emitting unit 20 surrounding the pad member 10 emits light or shines each time the pad member 10 is beaten.

According to the present embodiment, in the light-emitting unit 20, the light having entered from the LED 31 is guided along the annular axis of the light transmitter 21 by utilizing the principles of light propagation of an optical fiber, and at the same time, light is appropriately emitted from the light-emitting surface 21*c*, whereby it is possible to cause the light-emitting unit 20 to shine along the whole periphery except a portion thereof. Further, the light can be emitted in various fashions determined by the manner of provision of the light-emitting surface 21*c*, whereby ornamental manners of light emission suited to the instrument of a drum type can be easily realized. Further, the light-emitting unit 20 is suitable for display of instructions for beats, i.e. a so-called navigating display, so that it is easy to realize functions of games, such as a mole-striking game. Further, the whole light-emitting unit 20 can be caused to shine using a minimum number of light-generating member (light source), which not only contributes to simplification of the construction of the instrument and reduction of manufacturing costs, but also makes the instrument durable with minimized possibility of failure. Thus, the use of a minimum number of light source simplified in construction suffices for causing the peripheral part of the pad member to shine. What is more, the light source 30 can be easily mounted into or removed from the upper case 6 separately from the light transmitter 21 and the reflecting cover 23. Therefore, the maintenance and change of color of the LED 31 can be easily carried out, and the design of the instrument concerning the light-emitting unit 20 can be easily changed. In short, according to the present embodiment, the peripheral area along whole circumference of the pad member can be caused to shine by a simple construction while preserving durability and low manufacturing costs.

Further, the pad member 10, the sensor support member 40, the sensor section 41, etc. are supported on the upper case 6 in a manner being floated therefrom via the thin membrane portion 42*a* which can suppress the transmission of vibrations. This makes the transmission of vibrations independent of the upper case 6, and thus the structure of the instrument prevents intrusion of noise. Further, the bridge members 14 extend radially inward from the portions of the underside of the pad member 10 in the vicinity of the periphery of the same and are formed to be wide in the direction of the circumference of the pad member 10, so that vibrations of the pad member 10 caused by beats on the pad member 10 are transmitted through wide transmission paths along the peripheral area of the pad member 10 and radially inward via the bridge members 14. This effectively prevents "non-uniform sensitivity" whereby a uniform output from the instrument can be obtained irrespective of the location of a point of a beat on the pad member 10. In short, the transmission of vibrations from the case is effectively controlled to prevent intrusion of noise by virtue of the unique structure of the instrument, and at the same time, the non-uniform sensitivity i.e. variation in sensitivity dependent on the location of a point of a beat can be effectively reduced.

Second embodiment of the invention

The second embodiment is distinguished from the above-described first embodiment in the construction of the light-emitting unit and the manner of attachment of the light-emitting unit to the upper case. The appearance of the electronic musical instrument according to the present embodiment, the constructions of the pad member 10, sensor support member 40, sensor section 41, bridge members 14, and resilient membrane members 42 are identical to those of the first embodiment, and therefore detailed description thereof will be omitted.

Figure 8:
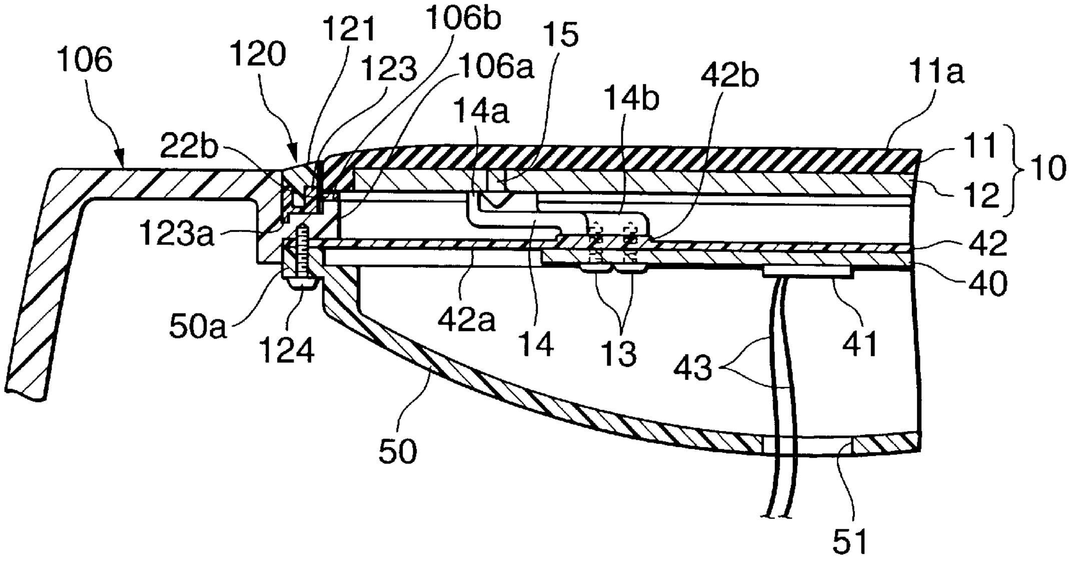
FIG. 8 is a fragmentary cross-sectional view corresponding to FIG. 4 of the first embodiment, showing the construction of essential parts of an electronic musical instrument according to a second embodiment of the present invention.

FIG. 8 is a fragmentary cross-sectional view showing the construction of essential parts of the electronic musical instrument of a drum type (hereinafter referred to as "the electronic drum") according to the present embodiment, and which is taken on line A—A of FIG. 1 of the first embodiment, similarly to FIG. 4.

The light-emitting unit 120 is comprised of a light transmitter 121, a reflecting cover 123, and a light source 30. The light transmitter 121 is distinguished from the light transmitter 21 of the first embodiment in that the stays 22 are omitted. The reflecting cover 123 is distinguished from the reflecting cover 23 of the first embodiment in that it has a positioning protrusion 123*a*. The manner of fitting of the light transmitter 121 and the reflecting cover 123, the construction of the light source 30, and the light-emitting unit 120 having a substantially annular shape are the same as in the first embodiment.

The positioning protrusion 123*a* is formed integrally on the underside surface of an outer peripheral edge of the reflecting cover 123 such that it extends along the whole periphery thereof. The upper case 106 is formed with a groove in which the positioning protrusion 123*a* is fitted. The light-emitting unit 120 is fixed to the upper case 106 with the outer peripheral surface thereof being bonded to the upper case 106 and the positioning protrusion 123*a* being fitted in the groove. In mounting the light-emitting unit 120, the positioning protrusion 123*a* serves as a temporarily fixing member, and positions the light-emitting unit 20 in place with respect to the upper case 106. What is more, the positioning protrusion 123*a* serves to increase the strength of bonding the light-emitting unit 20 to the upper case 106.

While in the first embodiment of the present invention, the thin membrane portion 42*a* of the resilient membrane member 42 is sandwiched between the stays 22 of the light transmitter 21*s* and the annular rib 6*a* of the upper case 6, in the second embodiment, the thin membrane portion 42*a* is sandwiched between the upper case 106 and a lower case 50. The lower case 50 is made of polystyrene or the like, and formed with a hole 51 at a location below the sensor section 41, for allowing a lead 43 to extend therethrough.

Specifically, the thin membrane portion 42*a* of the resilient membrane member 42 is sandwiched between the underside surface of a thin membrane-holding portion 106*a* of the upper case 106 and the top surface of a thin membrane-holding portion 50*a* of the lower case 50, and secured to the upper and lower cases 106 and 50 by screws 42*a*. The resilient membrane member 42 is thus fixed to the upper case 106 and the lower case 50.

In the present embodiment, the top surface 106*b* of the thin membrane-holding portion 106*a* of the upper case 106 and the cushioning member 22*b* serve as a stopper which is similar to the top surface 22*a* of the stay 22 etc. of the first embodiment, thereby preventing an excessive movement of the pad member 10. It should be noted that the generation of a drum sound and the emission of light from the light-emitting unit 120 are controlled in the same manner as described as to the first embodiment.

The electronic drum according to the present embodiment is assembled in the following manner:

First, the sensor section 41, the resilient membrane member 42 and the lower ends 14*b* of the bridge members 14 are secured to the sensor support member 40, and at the same time, the pad member 10 (pad plate 12 thereof) and the upper ends 14*a* of the bridge members 14 are secured to each other, whereby all of these components are formed into a single assembly. Then, this assembly is turned upside down, and the inverted assembly is placed onto the upper case 106 in an upside down position such that the thin membrane portion 42*a* is positioned on the thin membrane-holding portion 106*a* of the upper case 106. Then, the lower case 50 is placed onto the assembly such that the thin membrane-holding portion 50*a* of the lower case 50 and the thin membrane-holding portion 106*a* of the upper case hold the thin membrane portion 42*a* therebetween, and then screws 124 are tightened. The light transmitter 121 and the reflecting cover 123 can be mounted into the upper case 106 before or after the above assembly is fixed to the upper case 106. The mounting of the light source 30 is carried out in the same manner as in the first embodiment.

According to the second embodiment, the same advantageous effects as provided by the first embodiment can be obtained such as a simple construction, ornamental light emission along the whole peripheral area of the pad member caused by a minimum number of light source, and facilitation of realization of the function of navigating display and the functions of games.

Further, the assembly of the pad member 10, the sensor support member 40, the sensor section 41, and other associated components is supported by the upper case 106 and the lower case 50 only via the thin membrane portion 42*a* which can suppress the transmission of vibrations in a floated manner, so that the same advantageous effects as provided by the first embodiment can be obtained, such as prevention of intrusion of noise. Further, the bridge members 14 provide the same advantageous effects as provided by the first embodiment, such as uniformity of sensitivity in detection of beats.

Further, the lower case 50 has no other opening but the small hole 51, and is highly air-tight, with less restrictions concerning its shape, so that it is easy to use the lower case 50 as a speaker box as well. Further, the lower case 50 can be not only simplified in construction but also configured to have no large hole, which contributes to improvement of quality of sounds.

Third embodiment

Figure 9A:
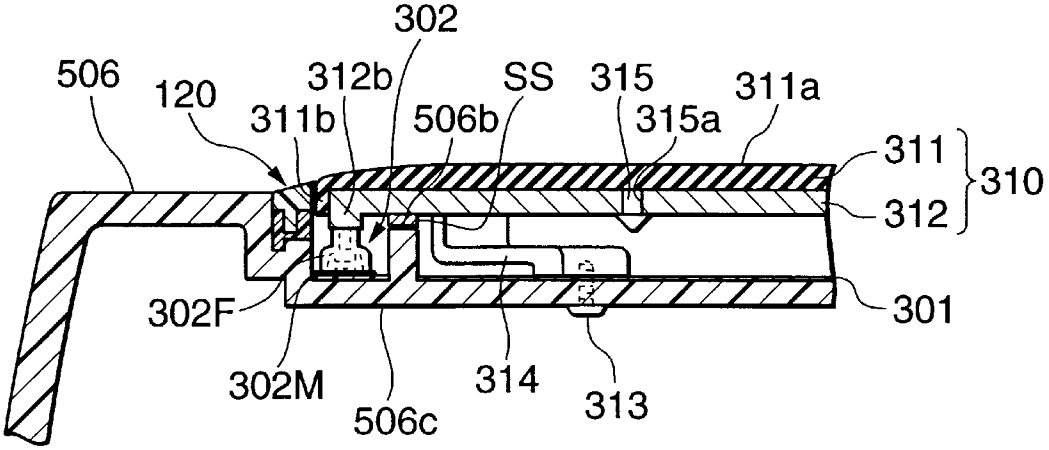
FIG. 9A is a fragmentary cross-sectional view showing the construction of essential parts of an electronic musical instrument according to a third embodiment of the present invention.
Figure 9B:
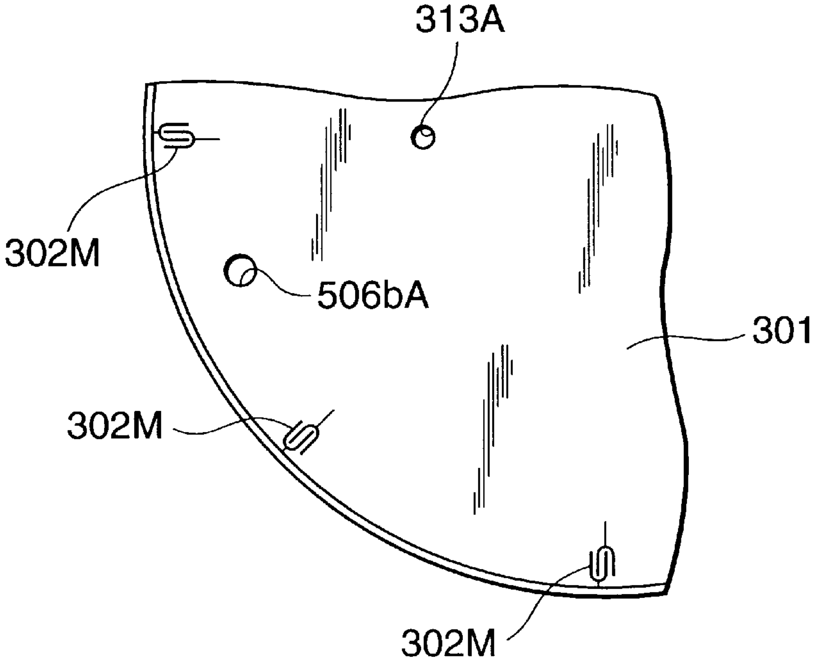
FIG. 9B is a fragmentary plan view showing a film for fixed contacts, appearing in FIG. 9A.

FIG. 9A is a fragmentary cross-sectional view showing essential parts of an electronic musical instrument according to a third embodiment of the invention. FIG. 9B is a fragmentary plan view showing a film for fixed contacts. FIG. 9A is taken on line A—A of FIG. 1 of the first embodiment, similarly to FIG. 4.

In the present embodiment, the vibrations caused by beats are detected not by a piezoelectric pressure sensor but by contact switches. The construction of the light-emitting unit 120 and the manner of mounting of the light-emitting unit 120 in an upper case 506 are the same as in the second embodiment.

As shown in FIG. 9A, a pad member 310 is comprised of a pad skin member 311 and a pad plate 312. The pad plate 312 is made by shaping an iron plate into a disk configuration. The pad skin member 311 is formed of a resilient member, such as rubber, and the top surface thereof provides a beating surface 311*a* (surface to be beaten), which is beaten by the player during performance. Protrusions 315 having a hook-shaped end protrude from several points of the underside surface of the pad skin member 311, and are fitted through holes 315*a* formed in corresponding portions of the pad plate 312, whereby the pad skin member 311 is secured to the pad plate 312. Further, the pad skin member 311 may be secured to the pad plate 312 by an adhesive or the like.

The pad member 310 is arranged on a tray shaped bottom 506*c* of the upper case 506. A film 301 for fixed contacts is bonded to an upper surface of the bottom 506*c*, and as shown in FIG. 9B, the film 301 has respective suitable portions thereof formed with screw holes 313A and stopper through holes 506*b*A. The pad member 310 is connected to the upper case 506 via bridge members 314. The bridge members 314 each have a lower end fixed to the bottom 506*c* of the upper case 506 by a screw 313, and an upper end fixedly affixed to the underside of the pad plate 312. The bridge members 314 (three in number, for instance) are arranged at equidistant intervals, and have resiliency, thereby allowing the pad member 310 to be slightly moved vertically when the pad member 310 is beaten.

A plurality of stoppers 506*b* are projected from the upper surface of the bottom 506*c* of the upper case 506 and extend through the respective stopper through holes **506*b*A. The stoppers 506*b* (three in number, for instance, and spaced equidistantly) are arranged in the vicinity of the outer periphery of the pad member 310. When the pad member 310 is beaten, the stoppers 506*b* are brought into abutment on respective cushioning members SS bonded to the pad skin member 311 to thereby prevent an excessive movement of the pad member 310**.

The pad skin member 311 has a downwardly bent outer peripheral portion **311*b*. A plurality of switches 302 (eight in number for instance) are arranged in the vicinity of the outer peripheral edge of the film 301 at locations corresponding to an outer peripheral portion 312*b* of the pad plate 312. Each switch 302 is comprised of a pair of fixed contacts 302M arranged on the film 301 and a movable contact 302F. The fixed contacts 302M is in a pattern having the shape of comb teeth, and the switch 302 is closed and opened by the movable contact 302F being brought into contact with the fixed contacts 302M or moved away therefrom. The movable contact 302F has an upper end disposed in contact with the outer peripheral portion 312*b* of the pad plate 312, and as the pad member 310 is displaced downward, the movable contact 302F is pushed downward. As the movable contact 302F is pushed downward, it is brought into contact with the fixed contacts 302M, whereby a beat is detected. It should be noted that the movable contact 302**F may be implemented by a two making-contact type, whereby the strength of a beat may be detected.

The control of generation of musical tones and the control of light emission by the light-emitting unit 120 are carried out in a manner described hereinbelow. It should be noted that the arrangement of a control system of the present electric musical instrument is the same as that of the first embodiment which was described hereinbefore with reference to FIG. 7.

Figure 10:
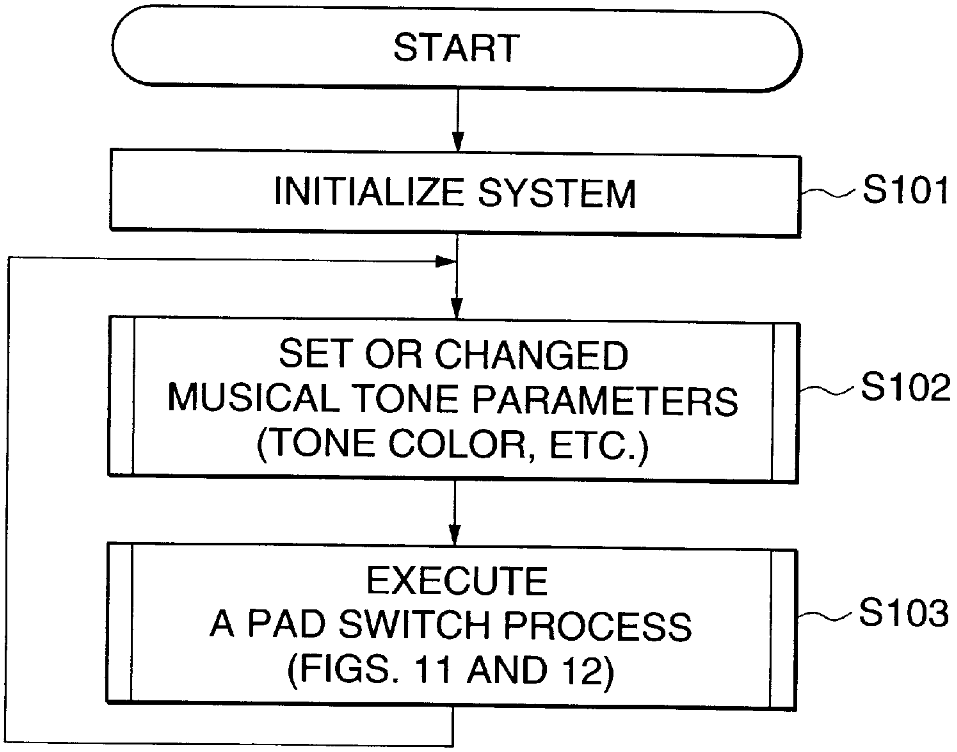
FIG. 10 is a flowchart of a main process which is executed by the electronic musical instrument according to the third embodiment.

FIG. 10 shows a flowchart of a main process executed by the electronic musical instrument according to the present embodiment. First, the system is initialized at a step S101, and musical tone parameters, such as tone color, are set or changed at a step S102. Then, a pad switch process, which will be described hereinafter with reference to FIGS. 11 and 12, is executed at a step S103, followed by the process returning to the step S102.

Figure 11:
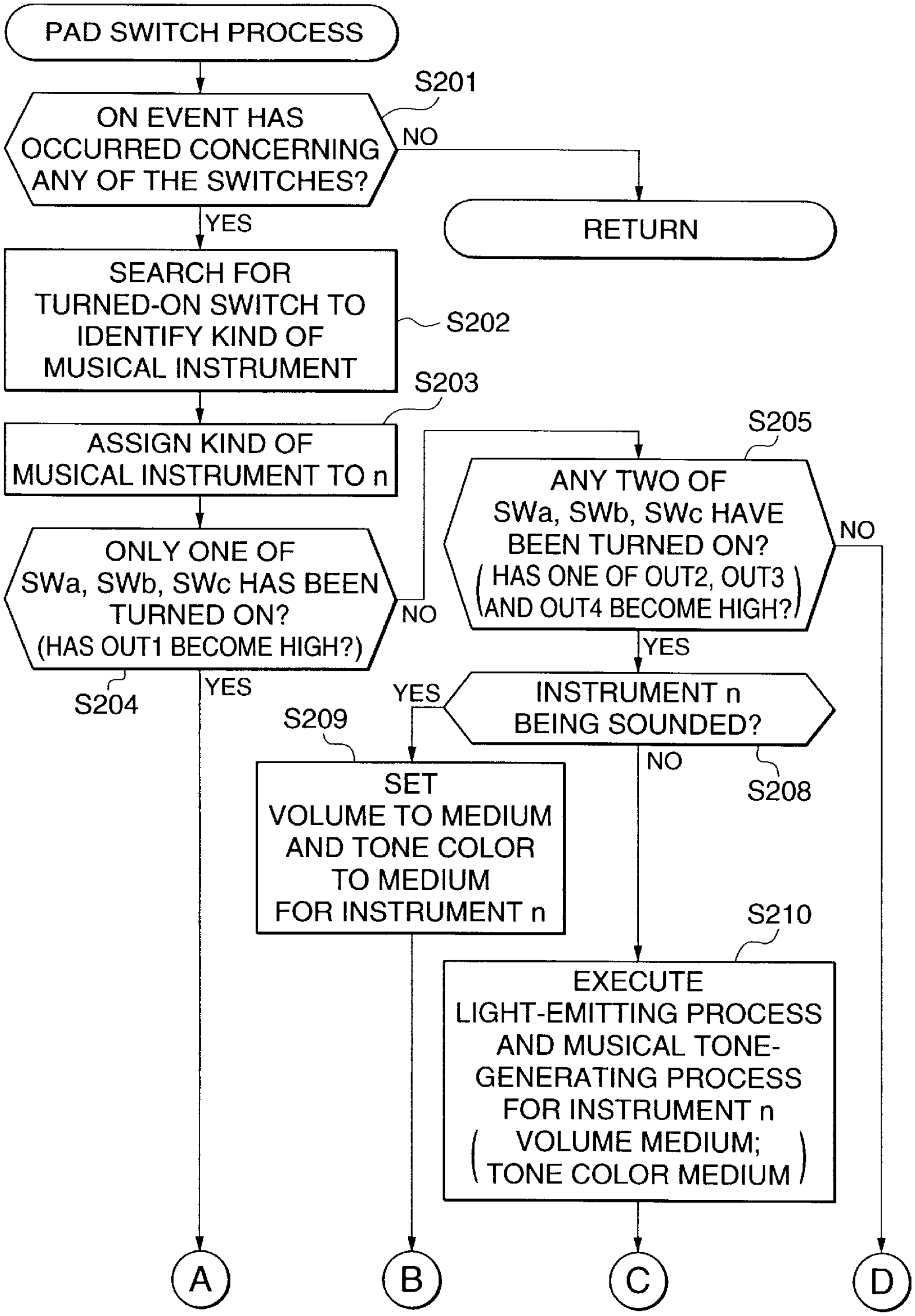
FIG. 11 is a flowchart of a pad switch process executed at a step S103 in FIG. 10.
Figure 12:
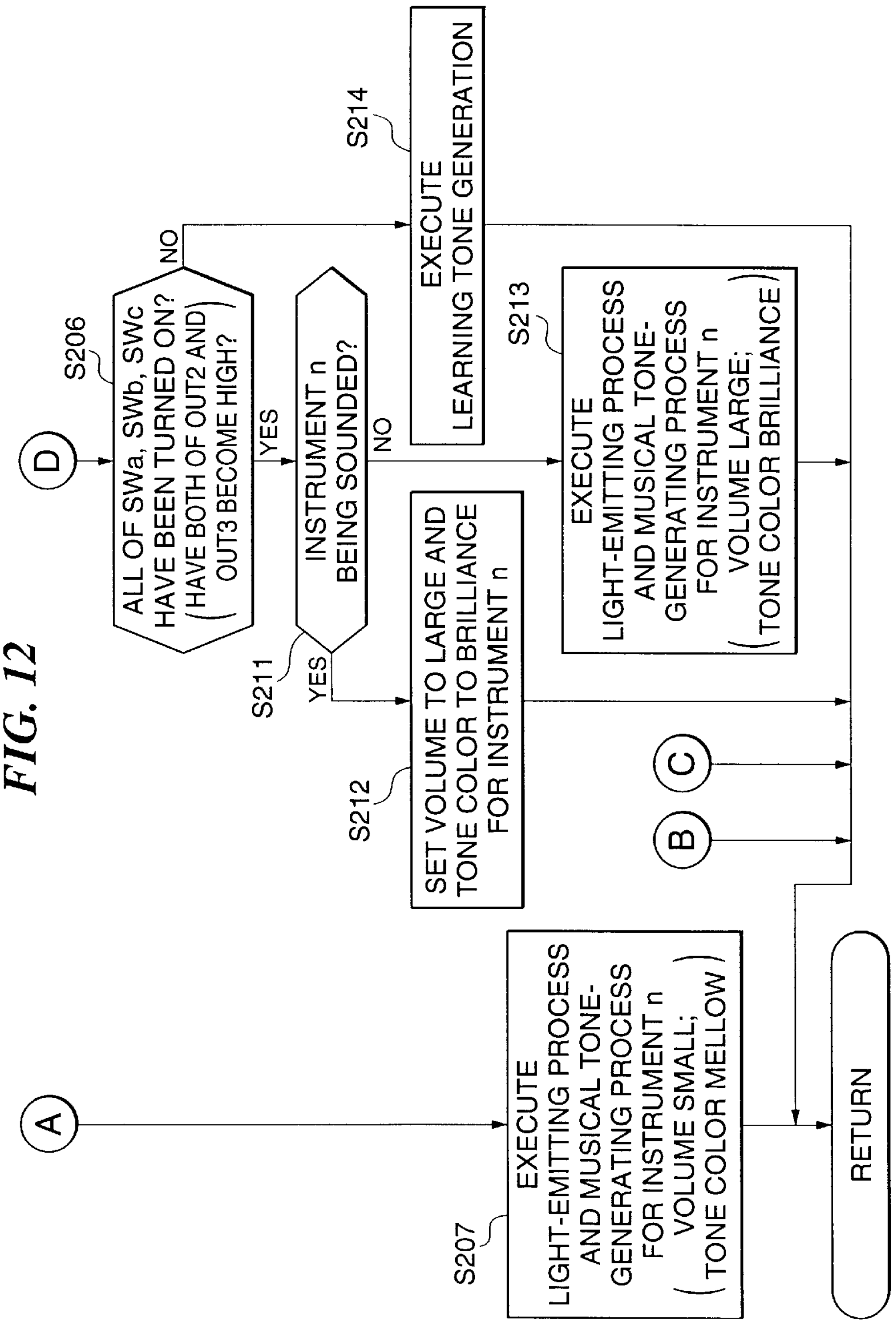
FIG. 12 is a continued part of the FIG. 11 flowchart.

FIGS. 11 and 12 show a flowchart of the pad switch process executed at the step S103 in FIG. 10. Although the eight switches 302 are actually provided, for simplicity of explanation, the following description will be given based on an example in which three switches 302 are arranged at equidistant intervals along the circumference of the pad member 310. These three switches will be referred to hereinafter as “SWa, SWb, SWc” respectively. Besides the switches SWa, SWb, SWc, there is provided a switch SWx, not shown, which is turned on prior to these switches (i.e. it has a shorter stroke than the three switches) when a beat is imparted to the pad member 310.

Figure 13:
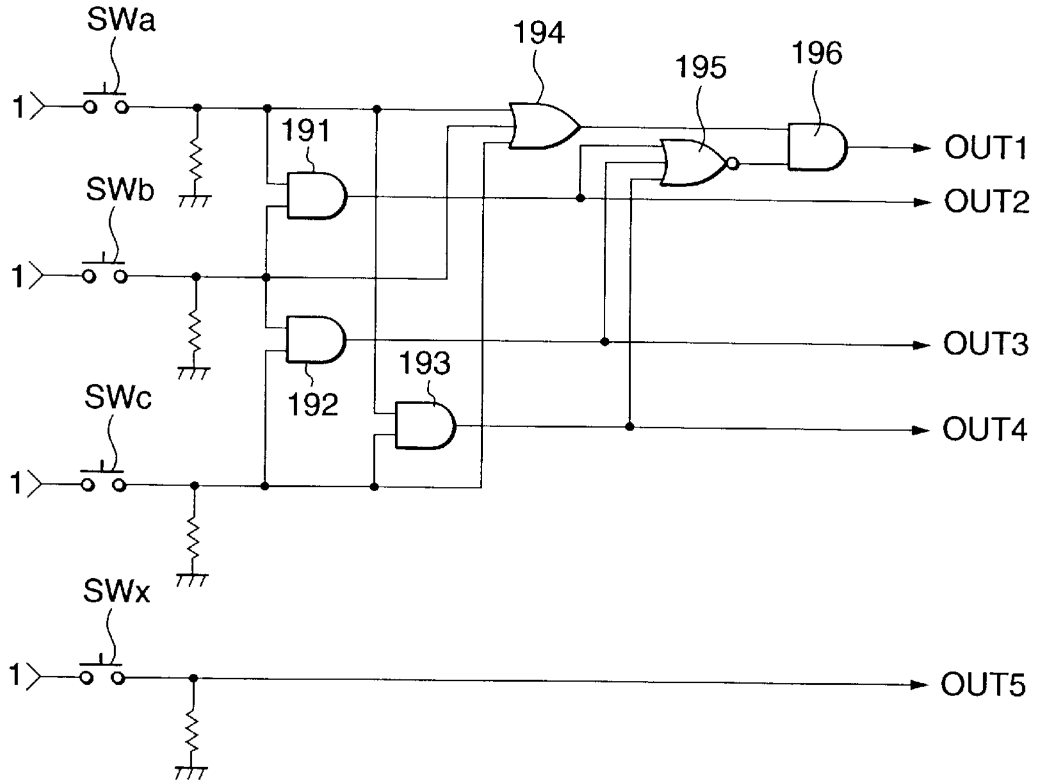
FIG. 13 is a view showing the configuration of an output circuit for switches.

FIG. 13 is a view showing an output circuit for the switches. The switches SWa, SWb have their outputs connected to respective inputs of an AND circuit 191. The switches SWb, SWc have their outputs connected to respective inputs of an AND circuit 192. Further, the switches SWc, SWa have their outputs connected to respective inputs of an AND circuit 193. The AND circuits 191, 192, 193 provide respective outputs OUT2, OUT3, OUT4. All the outputs of the switches SWa, SWb, SWc are also connected to respective inputs of an OR circuit 194, and all the outputs of the AND circuits 191, 192, 193 are connected to respective inputs of a NOR circuit 195. Further, the output of the OR circuit 194 and the output of the NOR circuit 195 are connected to respective inputs of an AND circuit 196 which provides an output OUT1. The output of the switch SWx provides an output OUT5.

Referring to FIG. 11, first, it is determined at a step S201 whether or not an ON event has occurred concerning any of the switches (in other words, any of the switches has been turned on). If an ON event has not occurred concerning any of the switches, the present process is immediately terminated, whereas if an ON event has occurred concerning any of the switches, the switch which has been turned on is searched for to identify the kind of a musical instrument (e.g. snare drum) whose tone is to be generated based on the ON event at a step S202. Then, the kind of the musical instrument is assigned to a variable n indicative of the name of the musical instrument at a step S203.

Then, it is determined at a step S204 whether or not only one of the switches SWa, SWb, SWc has been turned on. This is determined from the status of the output OUT1 shown in FIG. 13. When the output OUT1 is at a high level, it is determined that only one of the switches SWa, SWb, SWc has been turned on. If the answer to this question is negative, it is determined at a step S205 whether or not any two of the switches SWa, SWb, SWc have been turned on. This is determined from the status of the outputs OUT2, OUT3, OUT4, and when only one of the outputs OUT2, OUT3, OUT4 is at a high level, it is determined that only two of these switches have been turned on. If the answer to this question is negative, it is determined at a step S206 whether or not all of the switches SWa, SWb, SWc have been turned on. This is determined from the statuses of the outputs OUT2, OUT3 in FIG. 1, and when both of them are at a high level, it is determined that all the switches SWa, SWb, SWc have been turned.

If the answer to the question of the step S204 is affirmative, i.e. if only one of the switches SWa, SWb, SWc has been turned on, a light emitting process and a musical tone-generating process of the musical instrument n are executed at a step S207. More specifically, in the light emitting process, a control signal is sent out to cause light emission by the LED 31 (in the example shown in FIG. 17, referred to hereinafter, a bipolar light-emitting diode (BLD)) of the light source 30 of the light-emitting element 120. Further, in the musical tone-generating process, a tone generator for the designated musical instrument n is instructed for generation of a musical tone, and the volume of the musical tone is set to “small” and the tone color to “mellow”. To make the tone color “mellow”, it is only required that the cut-off frequency of a low-pass filter is shifted to a low frequency range. Then, the present process is terminated.

If the answer to the question of the step S205 is affirmative, i.e. if only two of the switches SWa, SWb, SWc have been turned on, it is determined at a step S208 whether or not the musical instrument n is being sounded. If the answer to this question is affirmative, i.e. if the musical instrument n is being sounded, the volume of the musical instrument n is set to “medium”, and the tone color of a musical tone being generated is set to “medium” at a step S209, followed by terminating the present process. To make the tone color “medium”, it is only required that the cut-off frequency of the low pass filter is set to a medium frequency range. On the other hand, if the answer to the question is negative, i.e. if the musical instrument n is not being sounded, the light-emitting process and the musical tone-generating process for the musical instrument n are carried out at a step S210. More specifically, similarly to the step S207, the control signal is sent out to cause light to be emitted by the LED 31, and at the same time, the tone generator for the designated musical instrument n is instructed for generation of a musical tone. However, in this case, the volume of the musical tone is set to "medium", and the tone color is set to "medium". Then, the present process is terminated.

If the answer to the question of the step S206 is affirmative, i.e. if all the switches SWa, SWb, SWc have been turned on, it is determined at a step S211 whether or not the musical instrument n is being sounded. If the answer to this question is affirmative, i.e. the musical instrument n is being sounded, the volume of the musical instrument n is set to "large", and at the same time the tone color is set to "brilliance" at a step S212, followed by terminating the present process. To make the tone color "brilliance", it is only required that the cut-off frequency of the low pass filter is shifted to a high frequency range. On the other hand, if the answer to the question is negative, i.e. if the musical instrument n is not being sounded, the light-emitting process and the musical tone-generating process for the musical instrument n are carried out at step S213. More specifically, similarly to the step S207, the control signal is sent out to cause light to be emitted by the LED 31, and at the same time, the tone generator for the designated musical instrument n is instructed for generation of a musical tone. In this case, however, the volume of the musical tone is set to "large", and the tone color is set to "brilliance". Then, the process is terminated.

If the answer to the question of the step S206 is negative, i.e. if it is determined that none of the switches SWa, SWb, SWc have been turned on, this corresponds to a case in which the switch SWx has been turned on (the output OUT5 is at a high level), and therefore, based on the musical tone parameters set at the step S102 in FIG. 10, a learning tone generation (generation of a predetermined musical tone for a trial beat) is carried out at a step S214, followed by terminating the present process.

According to this process, a beat on the pad member 310 causes the light-emitting unit 120 to emit light, and at the same time a musical tone dependent on the manner of beating is generated. For instance, if only one of the switches SWa, SWb, SWc has been turned on by a beat on a point in the vicinity of the outer peripheral edge of the pad member 310 or a feeble beat, the musical tone generation for the musical instrument n is carried out with a small volume and a mild tone color. If two of the switches SWa, SWb, SWc have been turned on by a beat on a point closer to the center of the pad member 310 or a medium strength beat, the musical tone generation for the musical instrument n is carried out with a medium volume and a moderately hard tone color. If all of the switches SWa, SWb, SWc have been turned on by a beat on the center of the pad member 310 or a large strength beat, the musical tone generation for the musical instrument n is carried out with a large volume and a rather hard tone color.

According to the present embodiment, the same advantageous effects as obtained by the first embodiment can be provided by the light-emitting unit 120, such as a simple construction and ornamental light emission along the whole periphery of the pad member caused by a minimum number of light source.

Further, not only the musical tone control but also the light emission control is carried out in response to detected beats, whereby the manner of use of the present musical instrument can be diversified e.g. by obtaining visual effects dependent on the manner of the beats.

In the first, second and third embodiments of the present invention, the light-emitting units 20, 120 are controlled to emit light only when a beat has been imparted, but this is not limitative. For example, similarly to a lighted keyboard, the light-emitting units may be also driven to emit light for instruction of a beat for practice. Further, they may be constantly driven to emit light for ornamental purposes, and further the musical instrument according to the present invention may be applied to the use of a game, such as the mole-striking game.

In the first, second, and third embodiments, the number of light sources 30 (or the number of LED's 31) may be plural, as exemplified hereinafter. In this case, reflecting sections may be provided at locations farthest from the light source 30, thereby causing the reflected light to return to a location from which the light is entered.

Although in the first, second, and third embodiments, the light-emitting surface 21*c* is finished to a uniformly roughened surface, this is not limitative, but it is only required that at least part of the surface to be viewed is finished to a roughened surface, and the manner of provision of the roughened surface is arbitrary. This manner of the provision has influence on the visual effects, and hence may be changed from the viewpoint of design as desired. The change of the design can be realized with ease.

Fourth embodiment

The fourth embodiment of the present invention is distinguished from the first, second, and third embodiments in which the present invention is applied to an electronic musical instrument of a drum type, in that the present invention is applied to an electronic musical instrument of a keyboard type.

Figure 14:
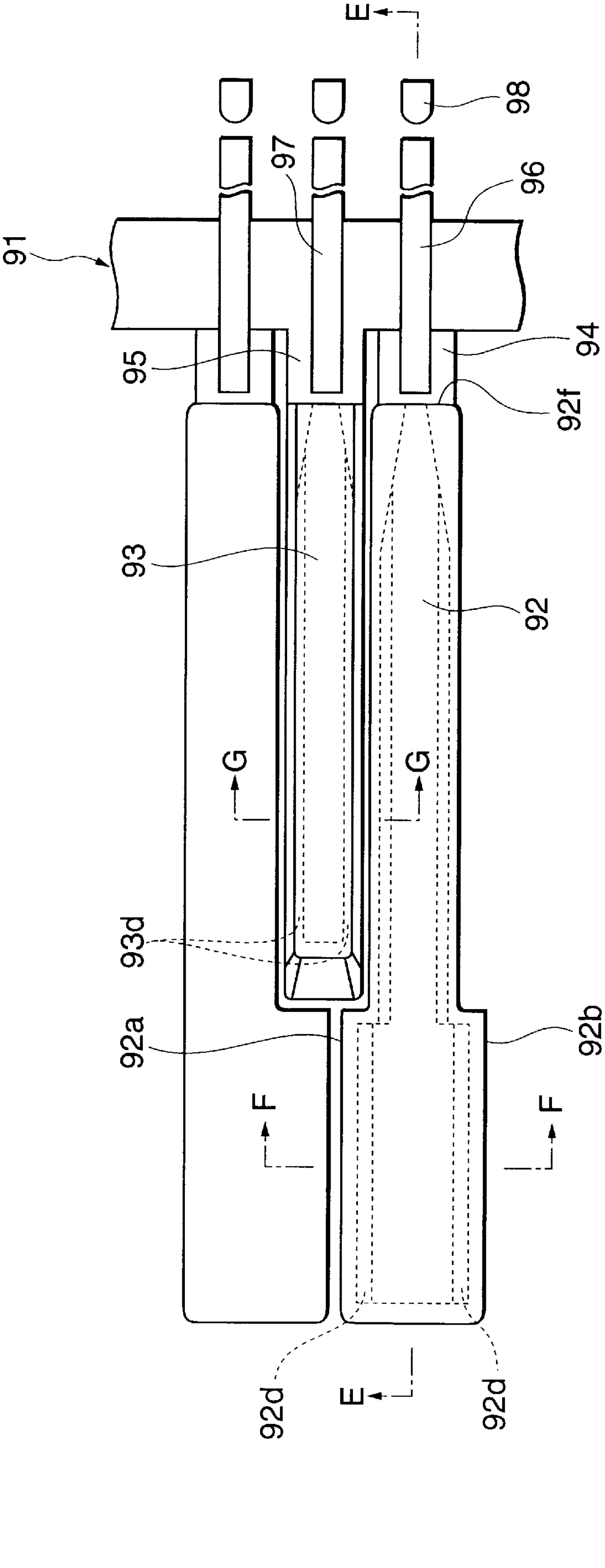
FIG. 14 is a fragmentary plan view showing the construction of essential parts of an electronic musical instrument of a keyboard type, according to a fourth embodiment of the invention.
Figure 15:
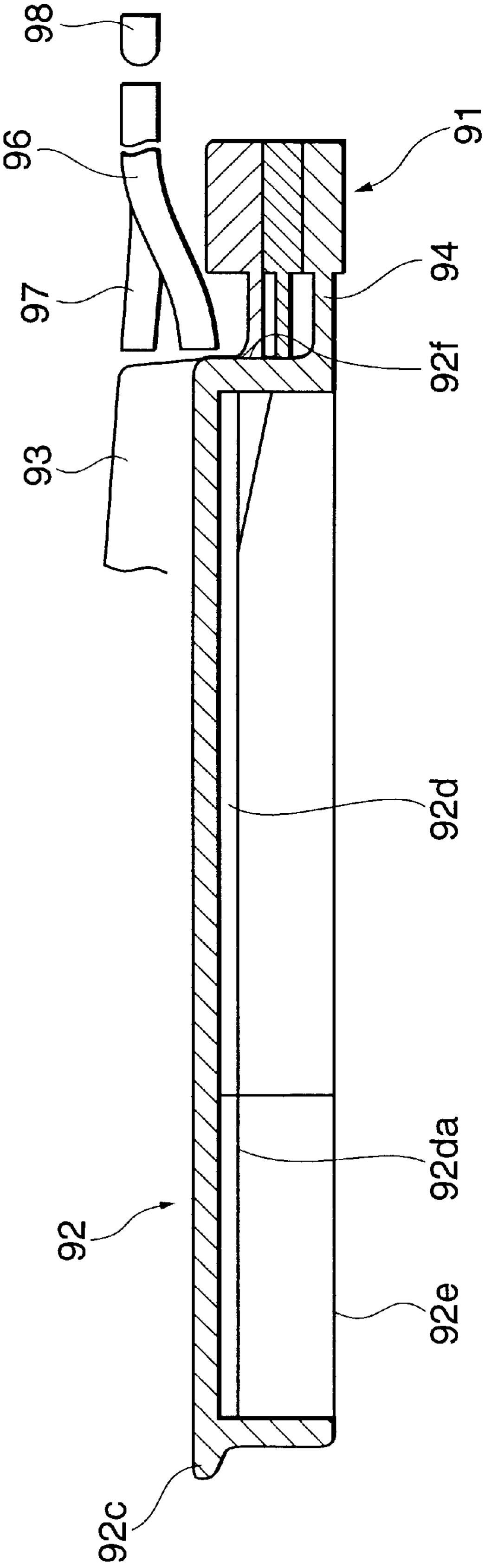
FIG. 15 is a cross-sectional view taken on line E—E of FIG. 14.
Figure 16B:
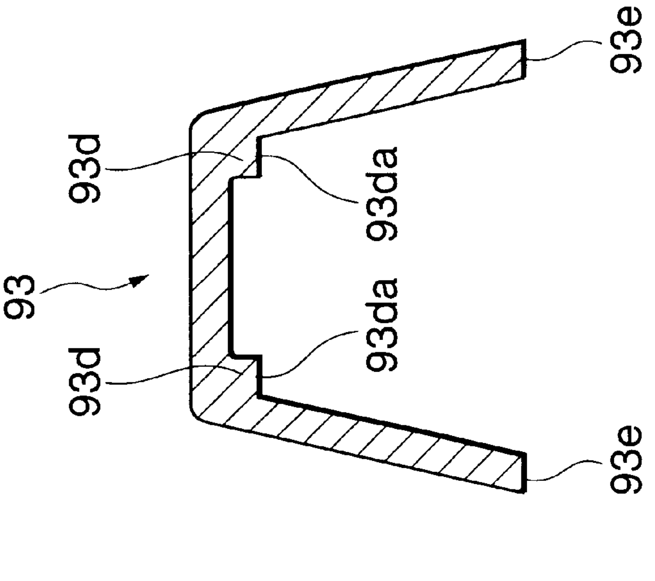
FIG. 16B is a cross-sectional view taken on line G—G of FIG. 14.
Figure 16A:
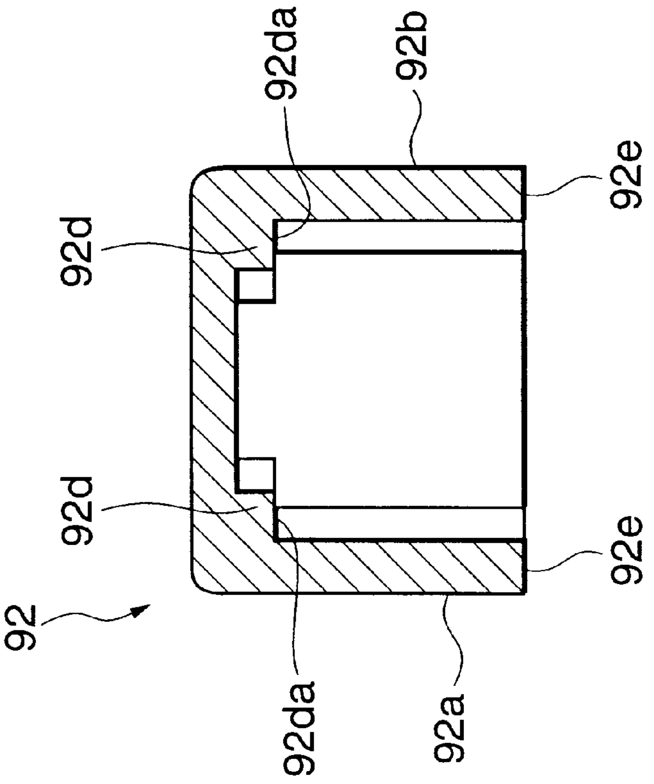
FIG. 16A is a cross-sectional view taken on line F—F of FIG. 14.

FIG. 14 is a fragmentary plan view showing the construction of essential parts of the electronic musical instrument of a keyboard type according to the fourth embodiment. FIG. 15 is a cross-sectional view taken on line E—E of FIG. 14, FIG. 16A is a cross-sectional view taken on line F—F of FIG. 14, and FIG. 16B is a cross-sectional view taken on line G—G of FIG. 14. It should be noted that in the present embodiment, the direction in which the front ends of keys are located (or a side of the keys toward the player) will be referred to as a front direction (front side), and the direction in which the rear ends of keys are located (or a side of the keys remote from the player) will be referred to as a rear direction (rear side).

Key units of a keyboard of the electronic musical instrument according to the present embodiment are configured on an octave-by-octave basis, and although all the key units are not shown, each key unit is comprised of black key units each formed in one piece, and white key units each formed of two separate parts (two white keys), each key unit being molded from a synthetic resin. Black and white key units have respective rear portions laminated one upon another to form a common root portion (proximal end) 91 having a three-layered structure.

As shown in FIG. 14, white keys 92, and a black key 93 are connected to the common root portion 91 via respective connecting portions 94 and 95. The connecting portions 94, 95 are adapted to allow the white and black keys 92, 93 to be pivotally moved in a direction of key depression (vertical direction). The white keys 92 are made of a transparent material, while the black key 93 is made of a black semi-transparent material through which light can be transmitted.

In the present embodiment, a key switch, not shown, is provided for each key. The key switch has the same construction for detecting key depression as that of a conventional one, and hence detailed description thereof is omitted. Further, an actuator for depressing the key switch, a key guide for preventing laterally-deviated pivotal motion of the key, etc. are also provided for each key. However, these components which are not concerned with light emission are not shown, either.

An optical fiber 96 is provided for each white key 92, which extends above the common root portion 91, with a front end (distal end) thereof disposed in closely opposed relation to a rear end face **92*f* of the body of the white key 92. At a root portion of the optical fiber 96, there is arranged an LED 98, from which light is emitted and transmitted through the optical fiber 96 to enter the body of the white key 92 via the rear end face 92*f*. An optical fiber 97 for the black key 93** is similarly constructed and arranged.

As shown in FIG. 16A, the white key 92 has a substantially inverted U-shaped cross section, and an underside surface opposite to a key depression surface (top surface) of the white key 92 is formed with a pair of stepped portions **92*d* in bilateral symmetry at respective lateral side portions. The white key 92 has the overall surface thereof finished to a very low roughness (similarly to the outer peripheral surface 21*d* and the inner peripheral surface 21*e* of the light transmitter 21 of the first embodiment). However, underside surfaces 92*da* of the stepped portions 92*d*, lateral side surfaces 92*a*, 92*b*, and a sloped surface 92*c* of the underside of a front end portion 92C of the body (see FIG. 15) are finished to a diffusing surface slightly roughened (similarly to the light-emitting surface 21*c*** of the first embodiment).

Therefore, when light transmitting through the interior of the white key 92 impinges on the surface very low in surface roughness at an angle of incidence equal to or larger than a predetermined angle, it is substantially totally reflected therefrom. This causes the light emitted from the LED 98 and entering the white key 92 via the rear end face **92*f* to be efficiently guided toward the front end along the longitudinal axis of the white key 92 by so-called principles of light propagation of an optical fiber. On the other hand, since the underside surfaces 92*da* of the stepped portions 92*d*, the lateral side surfaces 92*a*, 92*b*, and the sloped surface 92*c* of the underside of the front end portion 92C of the body are slightly roughened, the light impinging on these surfaces are more readily diffused, so that even light with a large angle of incidence with respect to these surfaces leaks out of the white key 92 without being totally reflected, to say nothing of light having a small angle of incidence with respect to the same. This causes the two side surfaces 92*a*, 92*b* to appear to shine by themselves to the player at a position within the sight of these surfaces. Further, since the key depression surface of the white key 92 is transparent, the light diffused from the underside surfaces 92*da* of the stepped portions 92*d* as well as from the both side surfaces 92*a*, 92*b* and the sloped surface 92*c* is transmitted through the interior of the white key 92** to leak out via the key depression surface, thereby being visually recognized. Therefore, even from a position out of the direct sight of these surfaces, they appear to shine via the key depression surface.

It should be noted that in place of or in addition to the underside surfaces **92*da* of the stepped portions 92*d*, lower end surfaces 92*e* of the white key 92 may be similarly finished to roughened surfaces. Further, either of the underside surfaces 92*da* of the stepped portions 92*d* or the two side surfaces 92*a*, 92*b* alone may be roughened. Further, if the sloped surface 92*c* of the underside of the front end portion 92C of the body of the key 92 is formed at a sloping angle of approximately 45 degrees, it is possible to reflect upward light incident thereon even if it has a very low surface roughness, thereby enabling the reflected light to be visually recognized. Therefore, the sloped surface 92*c*** is not necessarily required to be roughened.

As to the black key 93, as shown in FIG. 16B, only underside surfaces **93*da* of stepped portions 93*d* corresponding to the underside surfaces 92*da* of the stepped portions 92*d* of the white key 92 are finished to roughened surfaces, and the other surfaces are finished to a very low roughness. Although the black key 93 has a lower transparency than that of the white key 92, it has a shorter total length, which enables the light emission to be visually recognized well only by diffusion of the entered light from the underside surfaces 93*da*. It should be noted that in place of or in addition to the underside surfaces 93*da* of the stepped portions 93*d*, lower end surfaces 93*e* of the black key 93** may be similarly finished to roughened surfaces.

According to the present embodiment, musical tones are generated in response to a detected key depressing operation, like a so-called lighted keyboard. While thus generating musical tones, not only the musical tone control, but also the light emission control is also carried out. For example, light emission may be carried out to indicate keys to be depressed for tutorial purposes, or may be constantly carried out for ornamental purposes.

According to the present embodiment, the keys are made of a transparent material, and the light having entered the key from the rear end thereof is guided toward the front end thereof, and at the same time caused to appropriately leak via the diffusing surfaces. This makes it possible to cause desired portions of the keys to shine by a simple construction. Further, the lighted portions and the manner of visual recognition thereof can be varied depending upon the locations of the diffusing surfaces and the manner of provision of the same. This makes it possible to freely configure the light emission in a manner adapted to the type of the electronic keyboard. Therefore, the degree of freedom of design is high and the light emission for ornamental purposes can be carried out with ease. In short, the present embodiment makes it possible to cause keys to shine in a desired manner, by a simple construction.

Further, not only the musical tone control but also the light emission control is carried out in response to detected beats, whereby the manner of use of the present musical instrument can be diversified e.g. by obtaining visual effects dependent on beats.

It should be noted that the locations of diffusing surfaces are not limited to the illustrated examples, but they can be provided at any desired locations from the viewpoint of the design. In this case, part of the light having entered a key may be caused to directly leak out of the key via some diffusing surfaces (e.g. opposite side walls **92*a*, 92*b*), thereby allowing the light to be visually recognized, and also, part of the light diffused from some diffusing surfaces (e.g. the underside surfaces 92*d* of the stepped portions 92*d***) may be transmitted through the inside of the key to leak out via the key depression surface, thereby allowing the light to be visually recognized. Thus, the light can be visually recognized by at least one of the above-mentioned two ways of the visual recognition.

Although in the first to third embodiments, one LED 31 is employed for the light source 30, but this is not limitative, but two LED's may be provided in a back-to-back arrangement. FIGS. 17A to 17D shows a variation of the light source (light source 30').

Figure 17A:
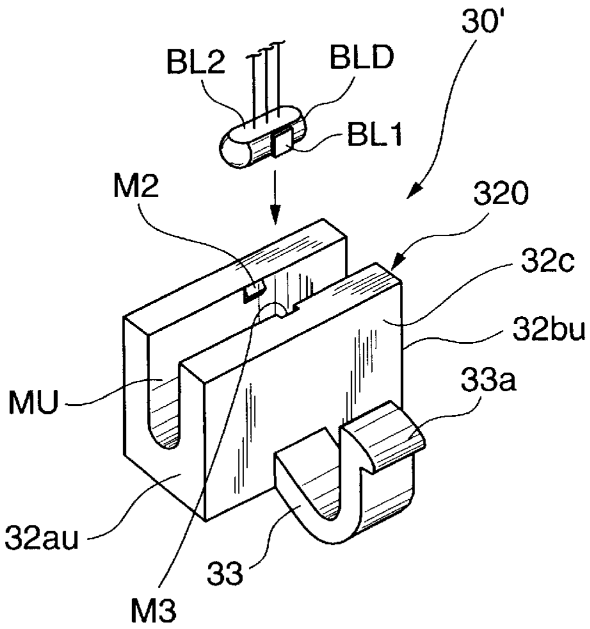
Figure 17B:
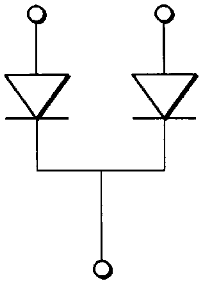
Figure 17C:
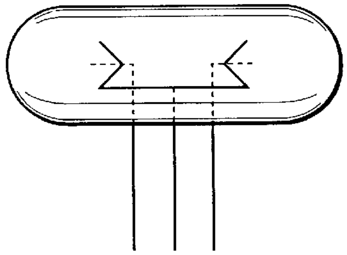
Figure 17D:
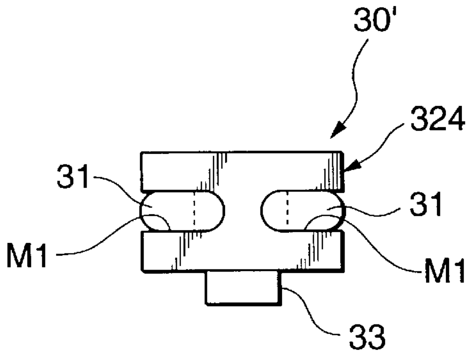

FIG. 17A shows the light source, FIG. 17B the construction of a bipolar light-emitting diode (BLD), FIG. 17C the appearance of the bipolar light-emitting diode (BLD), and FIG. 17D the construction of an LED cover.

The light source 30' shown in FIGS. 17A to 17D is differently configured from the light source 30 employed in the first to third embodiments, so as to realize an improved beat-instructing display (navigating display) and/or improved tutorial effects by visual recognition of beats, as well as increased efficiency of the light-emitting function. In short, according to the present embodiment, the light from the light source, such as the LED, is caused to enter both of the starting end face 21*a* and the terminating end face 21*b* of the light transmitter 21. In these figures, component parts and elements identical to those of the light source 30 are designated by the same reference numerals as shown in FIG. 6, and detailed description thereof is omitted.

As shown in FIG. 17A, the light source 30' has an LED cover 320 which has a groove MU formed therein and extending linearly from one end face 32*au* to the other end face 32*bu* while maintaining a substantially uniform U-shaped cross section. In a central portion of the groove MU, a retaining protrusion M2 is formed on one inner side wall thereof, for preventing a bipolar LED (BLD) inserted in the groove M2 from slipping out of the groove M2, and a BLD guide groove M3 vertically formed in the opposite inner wall of the same in opposed relation to the protrusion M2.

In inserting the bipolar LED BLD into the cover 320, a guided protrusion BL1 formed on one side surface of the bipolar LED BLD is guided by the BLD guide groove M3 whereby the bipolar LED BLD is inserted into the groove MU, until a lower end face BL2 of the bipolar LED BLD is retained by the retaining protrusion M2 upon completion of insertion of the bipolar LED BLD into the groove MU. The resulting assembly of the light source 30' is vertically turned upside down, and then fitted into the light-emitting unit 20, similarly to the light source 30 of the above-described embodiments.

The bipolar LED BLD is formed by internally connecting two LED's as shown in FIG. 17B, and enclosing the LED's in a resin which is then solidified. It has an appearance as shown in FIGS. 17A and 17C. The bipolar LED BLD has longitudinally opposite ends having a shape of the head of a cannonball and serving as a lens having an angle of collection of light (solid angle of collection) of 20 to 80 degrees.

If the bipolar LED BLD is not commercially available, it is custom-built. To reduce the manufacturing costs, an LED cover 324 may be configured as shown in FIG. 17D. FIG. 17D is a bottom view of the cover 324 as viewed from below. For instance, this cover 324 is formed by connecting two covers 30 as shown in FIG. 6 at the respective terminating end face-side surfaces 32*b*. The cover 324 also necessitates only one hook 33, which is arranged, therefore, in a central portion of the cover 324. By inserting two LED's 31, 31 in the respective grooves M1, M1 as shown in FIG. 17D, a bipolar type light source similar to that using the bipolar LED can be obtained.

The configuration of the light source 30' shown in FIGS. 17A to 17D ensures more intense and more uniform brightness of the light.

Although in the first embodiment, three stays 22 of the same configuration are arranged at equidistant intervals, this is not limitative, but the number and manner of arrangement of stays 22 may be varied. For example, at one of the locations for the above three stays 22, two stays may be arranged side by side, or a stay having a different configuration may be arranged. This can automatically bring the light transmitter 21 and the upper case 6 into a predetermined unique positional relationship in the circumferential direction, and hence positioning of the light transmitter 21 and the upper case 6 can be carried out with ease, facilitating the assembling operation. Further, the increased number of stays makes the electronic drum less susceptible to damage.

Further, in the above first to third embodiments, it is possible to write (curve, emboss) on the light-emitting surfaces (21*c*, etc.) various characters representing the name of a manufacturer, the names of musical instruments, such as "BONGO", and "KONGA", explanations of typical functions, such as "Navigate function" and "Use 1, 2, 3, 4". These characters or letters are made conspicuous when lighted, whereby the effects of visual recognition can be increased.

Fifth embodiment

Figure 18:
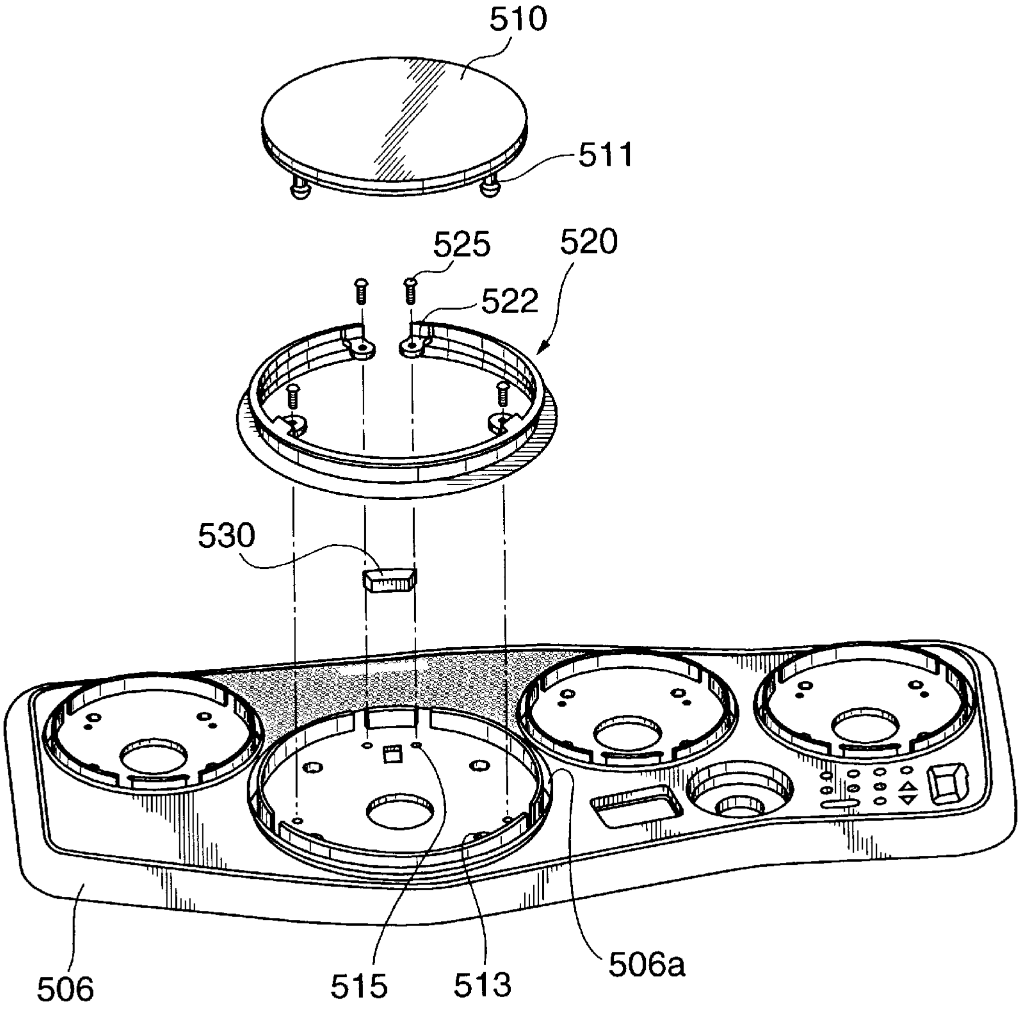
FIG. 18 is an exploded perspective view showing the construction of essential parts of an electronic musical instrument of a drum type according to a fifth embodiment of the present invention.

FIG. 18 is an exploded perspective view showing an electronic musical instrument of a drum type according to a fifth embodiment of the invention.

The electronic musical instrument according to the present embodiment is principally comprised of a case 506, and a light-emitting unit 520, a pad member 510, and other associated components, all of which are assembled with the case 506. The electronic musical instrument according to the present embodiment has four pad members, which are basically of the same configuration though different in size, as shown in FIG. 18. The location and arrangement of the light source 530 are the same as those of the light source 30 of the first embodiment. It should be noted that the light source 530 may be comprised of two or more LED's, or the number of light sources 530 themselves may be plural.

Figure 19A:
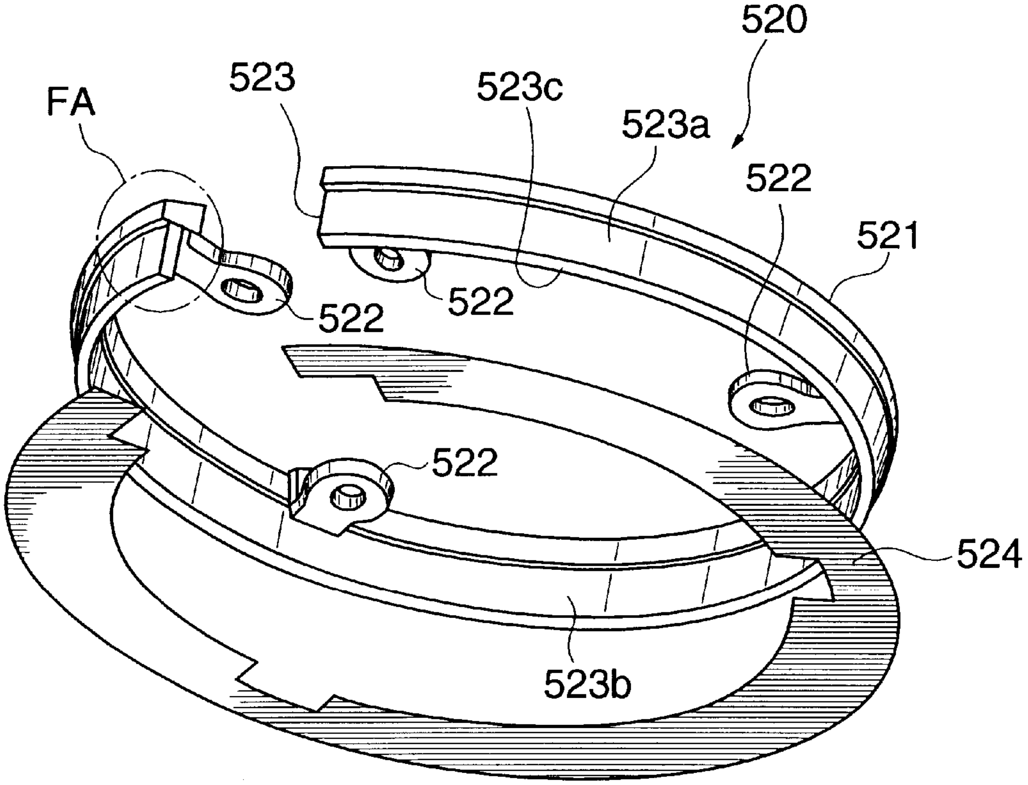
FIG. 19A is an exploded perspective view showing a light-emitting unit appearing in FIG. 18.
Figure 19B:
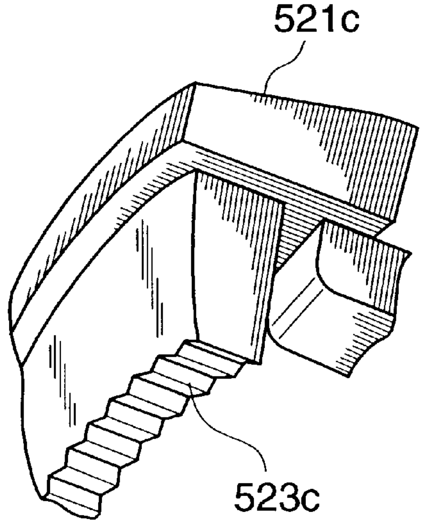
FIG. 19B is an enlarged view of a portion indicated as FA in FIG. 19A.

FIG. 19A is an exploded perspective view of the light-emitting unit 520 of the electronic musical instrument according to the present embodiment in which, however, the light source 530 is omitted. FIG. 19B is an enlarged view of a portion indicated as FA in FIG. 19A.

The light-emitting unit 520 is formed by bonding a tape material 524 (light reflecting member) to a light transmitter 521 except for a portion thereof for the light source 530. The light transmitter 521 is generally in the form of an annulus with a portion of the annulus cut out, and includes a protruding strip-shaped lower portion 523 which tapers as it extends downward. The light transmitter 521 is provided with four stays 522 via which the light transmitter 521 is mounted on the case 506. The stays 522 are formed integrally with the protruding strip-shaped portion 523 such that they extend radially inward from respective portions of an inner peripheral surface of the protruding strip-shaped portion 523. The light transmitter 521 has a top surface which is configured as a light-emitting surface 521*c* (surface) similarly to the light-emitting surface 21*c* of the light transmitter 21 of the first embodiment.

The protruding strip-shaped portion 523 has a bottom surface 523*c* formed with wavy serrations as shown in FIG. 19B. The ridges of the serrations extend in the radial direction of the light transmitter 521. The distance between the peak of each serration and the bottom of the same is about 0.5 mm (within a preferable range of about 0.3 to 1.0 mm). Light from the light source 530 is transmitted along the annular axis of the light transmitter 521, but since the direction of extension of the ridges of the serrations intersects with the direction of transmission of the light, part of the incident light reflected from the sloping surfaces of the serrations of the bottom surface 523*c* of the protruding strip-shaped portion 523 is directed upward. This increases the amount of light emitted from the light-emitting surface 521*c*.

Figure 20A:
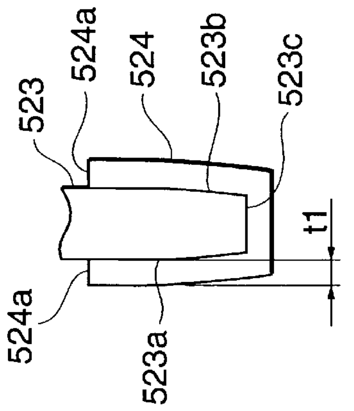
FIG. 20A is a view showing a protruding strip-shaped portion of a light transmitter with a tape material bonded thereto.
Figure 20B:
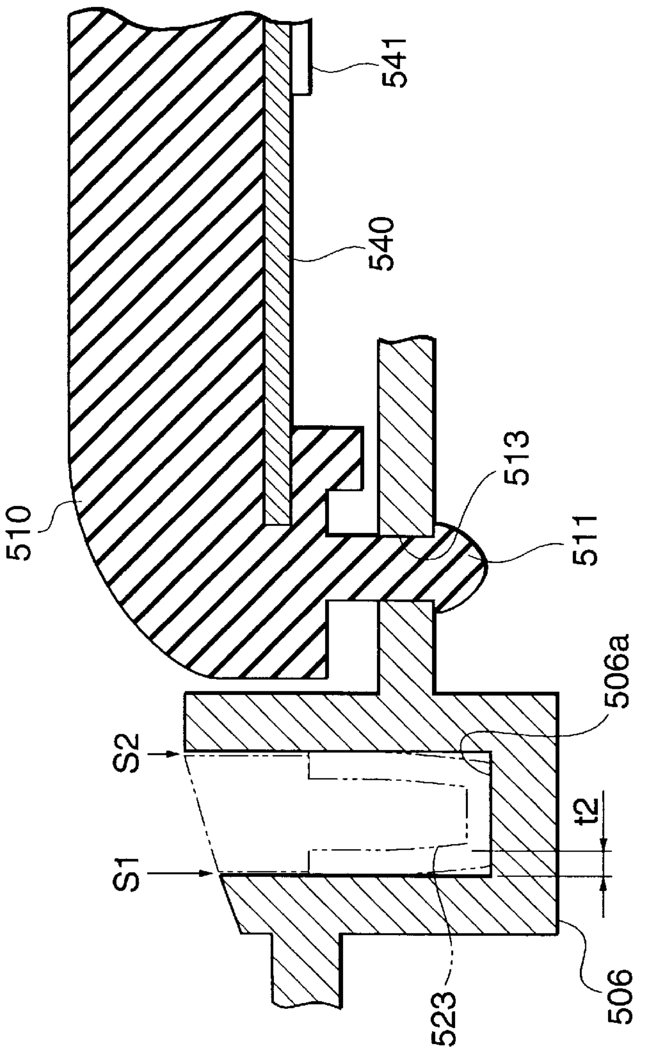
FIG. 20B is a fragmentary cross-sectional view showing the arrangement of essential parts of the electronic musical instrument including part of a case in which the protruding strip-shaped portion of the light transmitter is fitted.

FIG. 20A is a view showing the protruding strip-shaped portion 523 of the light transmitter 521 with the tape material 524 bonded thereto. FIG. 20B is a fragmentary cross-sectional view showing essential parts of the electronic musical instrument including a part of the case 506 in which the protruding strip-shaped portion of the light transmitter 521 is fitted.

The tape material 524 has a thickness t1 of about 1.5 mm (within a preferable range of 1 mm to 2 mm). The tape material 524 is formed of a highly resilient member, e.g. a foamed material of resin, and has a color suitable for reflecting light, such as white and milk white. To bond the tape material 524 to the light transmitter 521, first, a double-faced adhesive tape, not shown, formed of a non-foamed material is applied to the top surface of the tape material 524 (surface opposed to the protruding strip-shaped portion 523), and then as shown in FIG. 20A, the tape material 524 is bonded to an outer peripheral surface 523*a*, an inner peripheral surface 523*b*, the bottom surface 523*c* substantially along the whole periphery of the light transmitter 521, such that the tape material 524 covers the protruding strip-shaped portion 523. Further, the light source 530 is mounted into the light transmitter 521 to form the assembly of the light-emitting unit 520.

The case 506 is formed with four holes 513 and four pairs of holes 515, as shown in FIG. 18. Further, the case 506 is formed with a recess 506*a* (light transmitter holder, holder) in the form of a generally annular groove at a location opposed to the protruding strip-shaped portion 523 of the light transmitter 521. The pad member 510 has a sensor support member 540 mounted thereon, which is made by forming a rigid plate member into a disk configuration. Attached to the sensor support member 540 is a sensor section 541 which is similar in construction to the sensor section 41 of the first embodiment. The pad member 510 has four projections 511 which extend downward, as shown in FIGS. 18 and 20B. The construction and arrangement of the remaining components of the electronic musical instrument according to the present embodiment are the same as those of the first embodiment.

To assemble the light-emitting unit 520 and the pad member 510 with the case 506, first, the protruding strip-shaped portion 523 of the light-emitting unit 520 with the tape material 524 bonded thereto is press-fitted into the recess 506*a* of the case 506, whereby the light-emitting unit 520 is held by the case 506. Here, as shown in FIG. 20B, let it be assumed that the tape material 524 is not provided, and then a gap t2 will be formed between opposed side walls of the protruding strip-shaped portion 523 and the recess 506*a*. The gap t2 is set to approximately 1 mm, and is at least smaller than the thickness t1 of the tape material 524. That is, when the protruding strip-shaped portion 523 with the tape material 524 bonded thereto is fitted in the recess 506*a*, the tape material 524 is resiliently deformed (contracts) to substantially fill the gap. This reduces mechanical noise and the like caused by the gap between the light-emitting unit 520 and the case 506.

Particularly, as described hereinabove, the protruding strip-shaped portion 523 is tapered, and hence upper portions 524*a* of the tape material 524 are in firm abutment with the opposed inner walls of the recess 506*a*. In this state, the root portion of the protruding strip-shaped portion 523 of the light transmitter 521 forms gaps S1 and S2 (S1=S2) with respect to the inner walls of the recess 506*a*. This enhances the effect of prevention of mechanical noise such as "rattling".

Next, the stays 522 of the light transmitter 521 are fixed to the holes 515 of the case 506 by screws 525 (see FIG. 18), whereby the light-emitting unit 520 is fixed to the case 506. Then, the projections 511 of the pad member 510 are fitted through the holes 513 of the case 506, whereby the pad member 510 is fixed to the case 506. Thus, the light-emitting unit 520 and the pad member 510 are assembled with the case 506.

According to the present embodiment, the protruding strip-shaped portion 523 of the light-emitting unit 520 is press-fitted in the recess 506*a* of the case 506 via the resilient tape material 524, whereby the tape material 524 fills the gap between the opposed side walls of the protruding strip-shaped portion 523 and the recess 506*a*, and also serves as the cushioning member. Therefore, vibrations caused by beats on the pad member 510 are absorbed by the tape material 524 to prevent occurrence of mechanical noise such as "rattling". Especially, since the thickness t1 of the tape material 524 and the gap t2 between the opposed side walls of the protruding strip-shaped portion 523 and the recess 506*a* are set to satisfy the relationship of t1>t2, no gap remains after the protruding strip-shaped portion 523 is press-fitted into the recess 506*a*, providing an enhanced rattling prevention effect. Moreover, the protruding strip-shaped portion 523 and the recess 506*a* are fitted with each other by concavoconvex coupling with the tape material 524 being provided on all of the outer peripheral surface 523*a*, the inner peripheral surface 523*b* and the bottom surface 523*c*, so that the cushioning effects are obtained against shocks or impacts in both radial and vertical directions. This makes it possible to reduce rattling caused by beats on the pad member and at the same time enable the whole periphery of the pad member to shine.

Further, the bottom surface 523*c* of the protruding strip-shaped portion 523 of the light transmitter 521 is formed with wavy serrations, that is, the bottom surface 523*c* extending along the annular axis of the light transmitter 521 is wavy in cross-section. Light entering the light transmitter 521 from the light source 530 is transmitted along the annular axis of the light transmitter 521, and part of the light heading toward the bottom surface 523*c* is reflected from the sloping surfaces of the serrations to be directed toward the light-emitting surface 521*c*. Therefore, compared with a case in which the bottom surface 523*c* is simply formed as a plain surface, the amount of light emitted outward from the light-emitting surface 521*c* is increased. Further, since the tape material 524 is formed by a material having a color suitable for reflecting light, such as white, and at the same time the protruding strip-shaped portion 523 is covered with the tape material 524, the attenuation of light entered from the light source is reduced due to the reflecting action of the tape material 524, thereby increasing the effects of visual recognition. This increases the intensity of light emitted from the light transmitter 521, resulting in increased ease of visual recognition of emitted light from the light transmitter 521.

Although in the present embodiment, the light-emitting element 520 is directly held on the case 506, this is not limitative, but any material for holding the light transmitter may be interposed insofar as the light-emitting unit 520 is fixedly held on the case 506.

It should be noted that the structure of wavy serrations formed on the bottom surface 532*c* of the light transmitter 521 may be applied to the electronic musical instrument of a keyboard type according to the fourth embodiment.

For example, the lower end surfaces 92*e* of the white key 92 (see FIG. 16A) may be formed with wavy serrations. In the fourth embodiment, light from the LED 98 enters the body of the white key 92 from the rear end face 92*f* thereof, and therefore the lower end surfaces 92*e* should be profiled so as to provide transversely extending wave serrations in the longitudinal direction of the white key 92. This enables part of light entered from the light source to reflect from the lower end surfaces 92*e* and then be directed upward, and hence increase the amount of light emitted from the top (key depression surface and the like) of the white key 92. This in turn increases the intensity of light emitted from the light transmitter, resulting in increased ease of visual recognition.

It should be note that such surfaces with wavy serrations should be formed on surfaces opposite to the surface(s) to be visually recognized, and for example, the underside surfaces 92*da* of the stepped portions 92*d*, and as for the black key 93, the underside surfaces 93*da* of the stepped portions 93*d* and the lower end surface 93*e* may be formed with similar wave serrations.

The present invention is not limited to the electronic musical instruments of a drum type and a keyboard type described above by way of example, but may be also applied to other type electronic musical instruments.

What is claimed is:

1. An electronic musical instrument of a drum type comprising:

at least one pad member that has at least one surface to be beaten;

at least one detecting device that detects beats on the surface to be beaten of said at least one pad member;

a musical tone signal-generating section that generates a musical tone signal in response to an output from said at least one detecting device;

a light transmitter in a linear form arranged along a periphery of said pad member, said light transmitter having one end, another end, and an exposed surface, part of the exposed surface being roughened to provide a light-emitting surface; and a light source arranged in the vicinity of the one end of said light transmitter, for emitting light toward the one end, wherein said light transmitter guides light emitted from said light source and entering said light transmitter via the one end, by utilizing principles of light propagation of an optical fiber, toward the other end, and at the same time causes at least part of the light entering via the one end to emit out of said light transmitter.

2. An electronic musical instrument according to claim 1, wherein said light transmitter has a substantially annular shape having an outer periphery, part of which has a cutout formed therein to provide the one end and the other end, said light source being arranged in said cutout in a manner being interposed between the one end and the another end.

3. An electronic musical instrument according to claim 1, wherein said light transmitter has at least part of a surface opposite to said light-emitting surface thereof formed with wavy serrations such that said surface opposite to said light-emitting surface is wavy in cross section along a length of said light transmitter.

4. An electronic musical instrument of a keyboard type comprising:

at least one key formed of a light transmissive member, said at least one key having a distal end and a proximal end, part of said key being roughened to provide a diffusing surface;

at least one detecting device arranged for said at least one key, for detecting a key depressing operation applied to said at least one key;

a musical tone signal-generating section that generates a musical tone signal in response to an output from said at least one detecting device; and a light source arranged in the vicinity of the proximal end of said key, for emitting light toward the root portion, wherein said key is configured such that light emitted from said light source and entering said light transmitter via the proximal end is guided by utilizing principles of light propagation of an optical fiber, toward the distal end, and at least part of the light entering via the proximal end is diffused at the diffusing surface so as to be visually recognized from outside of said light transmitter.

5. An electronic musical instrument according to claim 4, wherein said key has a top surface, and the light entering said at least one key is visually recognized due to at least one of phenomena of the light directly leaking via the diffusing surface after being diffused at the diffusing surface, and the light leaking via the top surface of said key after being diffused at the diffusing surface and transmitting through an interior of said key.

6. An electronic musical instrument according to claim 4, wherein the diffusing surface has a bottom surface facing downward, at least part of which is formed with wavy serrations such that said bottom surface is wavy in cross section along a length of said key.

7. An electronic musical instrument of a drum type comprising:

at least one pad member that has at least one surface to be beaten;

at least one detecting device that detects beats on the at least one surface to be beaten of said at least one pad member;

a musical tone signal-generating section that generates a musical tone signal in response to an output from said at least one detecting device;

a case;

a light transmitter arranged along a periphery of said pad member;

a light source that emits light toward said light transmitter;

a light transmitter holder that holds said light transmitter fixedly with respect to said case; and a tape material, wherein said light transmitter is press-fitted in said light transmitter holder via said tape material and held therein.

8. An electronic musical instrument of a drum type comprising:

at least one pad member that has at least one surface to be beaten;

at least one detecting device that detects beats on the at least one surface to be beaten of said at least one pad member;

a musical tone signal-generating section that generates a musical tone signal in response to an output from said at least one detecting device;

a case;

a light transmitter arranged substantially along a whole periphery of said pad member, said light transmitter having a surface;

a light source that is configured to be sufficiently smaller than said light transmitter, and emits light toward said light transmitter; and a holder that holds said pad member and said light transmitter fixedly with respect to said case;

wherein at least part of said light emitted from said light source and transmitted through said light transmitter is visually recognized by being emitted out from said surface of said light transmitter.

9. An electronic musical instrument according to claim 8, wherein said light transmitter has faces other than said surface, the electronic musical instrument further comprising a light reflecting member that is arranged on said faces of said light transmitter other than the surface, wherein when said at least part of said light emitted from said light source and transmitted through said light transmitter is visually recognized by being emitted out from the surface of said light transmitter, an amount of said light emitted from the surface of said light transmitter is increased due to a reflecting action of said light reflecting member.

10. An electronic musical instrument of a drum type comprising:

at least one pad member that has at least one surface to be beaten;

at least one detecting device that detects beats on the at least one surface to be beaten of said at least one pad member;

a musical tone signal-generating section that generates a musical tone signal in response to an output from said at least one detecting device;

a case;

a light transmitter arranged along a periphery of said pad member;

a light source that emits light toward said light transmitter; and a holder that holds said pad member and said light transmitter fixedly with respect to said case;

wherein said light source is arranged at a location substantially below said pad member.

11. A shining method for an electronic musical instrument of a drum type, including at least one operating member at least part of which is formed by a light transmitter, the at least one operating member having one end, another end, a surface to be beaten, and a diffusing surface that is roughened, the electronic musical instrument detecting a beat on the surface to be beaten, and generating a musical tone signal in response to an output indicative of the detection, the method comprising the steps of:

causing light from a light source to enter the at least one operating member via the one end; and guiding the light entering the operating member via the one end toward the other end by utilizing principles of light propagation of an optical fiber, and causing at least part of the light entering the operating member via the one end to be diffused at the diffusing surface so as to be visually recognized from outside, wherein the light source is arranged in the vicinity of the one end of the operating member.

12. A shining method for an electronic musical instrument of a drum type including a pad member, the pad member having a surface to be beaten, the electronic musical instrument detecting a beat on the surface to be beaten of the pad member, and generating a musical tone signal in response to an output indicative of the detection, the method comprising the steps of:

causing light to be emitted from a light source toward a light transmitter arranged substantially along a whole periphery of the pad member; and causing the light emitted from the light transmitter to enter the light transmitter, and causing at least part of the light entering the light transmitter to be emitted out from the surface of the light transmitter so as to be visually recognized from outside, wherein the light source is configured to be sufficiently smaller than the light transmitter.

* * * * *